(12) United States Patent
Shodhan et al.

(10) Patent No.: US 10,990,368 B2
(45) Date of Patent: Apr. 27, 2021

(54) ON-PREMISES AND CLOUD-BASED SOFTWARE PROVISIONING

(71) Applicant: Oracle International Corporation, Redwood Shores, CA (US)

(72) Inventors: Neeraj Shodhan, Ahmedabad (IN); Pranay Bipin Shah, Gandhinagar (IN); Darpan Korat, Ahmedabad (IN); Hareshkumar Navadiya, Surat (IN); Indraraj Abhesangbhai Chavda, Bhavnagar (IN); Ravi Verma Vunikili, Gandhinagar (IN)

(73) Assignee: Oracle International Corporation, Redwood Shores, CA (US)

( * ) Notice: Subject to any disclaimer, the term of this patent is extended or adjusted under 35 U.S.C. 154(b) by 116 days.

(21) Appl. No.: 15/854,386

(22) Filed: Dec. 26, 2017

(65) Prior Publication Data
US 2019/0196800 A1  Jun. 27, 2019

(51) Int. Cl.
*G06F 8/60* (2018.01)
*G06F 8/38* (2018.01)
(Continued)

(52) U.S. Cl.
CPC ............... *G06F 8/60* (2013.01); *G06F 8/38* (2013.01); *H04L 41/22* (2013.01); *H04L 67/02* (2013.01);
(Continued)

(58) Field of Classification Search
CPC ............. G06F 8/60–61; G06F 8/63–64; G06F 9/455–45558
See application file for complete search history.

(56) References Cited

U.S. PATENT DOCUMENTS 5,805,897 A * 9/1998 Glowny .............. G06F 8/61
                                                    709/221
6,901,590 B2   5/2005 Narayanaswamy et al.
(Continued)

OTHER PUBLICATIONS

Yanchyshyn, M. "The Full Monty: Moving Beyond The Hybrid Cloud." (2015): 10-10. (Year: 2015).*

(Continued)

*Primary Examiner* — Doon Y Chow
*Assistant Examiner* — Joanne G Macasiano
(74) *Attorney, Agent, or Firm* — Potomac Law Group, PLLC

(57) ABSTRACT

Provisioning for a cloud service is provided. An instance of a provisioning object is created and initialized, and a graphical user interface (GUI) is generated. The GUI includes a home window, a configure window, an orchestrate window and a deploy window. The provisioning parameters are received from the GUI. The provisioning parameters indicate whether to deploy the software application on a local network or a remote network. A location object and a deployment object are created and initialized based on the provisioning parameters. The location object includes an on-premises object for a local network deployment or a cloud object for a remote network deployment. A command to deploy the software application is received from the GUI, and the software application is deployed to a local network or a remote network using the provisioning object, the location object and the deployment object.

20 Claims, 22 Drawing Sheets

(51) Int. Cl.
   *H04W 4/50* (2018.01)
   *H04L 12/24* (2006.01)
   *H04L 29/08* (2006.01)

(52) U.S. Cl.
   CPC .............. *H04L 67/10* (2013.01); *H04L 67/34* (2013.01); *H04W 4/50* (2018.02)

(56) References Cited

U.S. PATENT DOCUMENTS

| | | | |
|---|---|---|---|
| 7,069,553 | B2 | 6/2006 | Narayanaswamy et al. |
| 8,347,263 | B1* | 1/2013 | Offer .................... G06F 8/71 717/104 |
| 8,516,477 | B1 | 8/2013 | Kearns et al. |
| 8,817,777 | B2 | 8/2014 | Manian et al. |
| 8,832,175 | B2* | 9/2014 | du Preez ................ G06F 8/65 709/201 |
| 9,244,709 | B2* | 1/2016 | Aslam ................ G06F 9/45529 |
| 9,247,008 | B2 | 1/2016 | Narayanan et al. |
| 9,336,060 | B2 | 5/2016 | Nori et al. |
| 9,665,366 | B2* | 5/2017 | Kuchibhotla .......... G06F 8/71 |
| 9,935,825 | B2* | 4/2018 | Aswathanarayana .......... H04L 41/0806 |
| 10,338,969 | B2* | 7/2019 | Wilkinson .............. H04L 67/02 |
| 2003/0074430 | A1* | 4/2003 | Gieseke ............ H04L 41/0213 709/221 |
| 2012/0143938 | A1* | 6/2012 | du Preez ................ G06F 8/65 709/201 |
| 2012/0317561 | A1* | 12/2012 | Aslam ................ G06F 9/45529 717/168 |
| 2015/0309780 | A1* | 10/2015 | Ruehl ................ H04L 67/1095 717/176 |
| 2015/0341445 | A1 | 11/2015 | Nikolov et al. |
| 2016/0092210 | A1* | 3/2016 | Kuchibhotla ............ G06F 8/71 717/121 |
| 2016/0110183 | A1 | 4/2016 | Fu et al. |
| 2016/0142253 | A1 | 5/2016 | Steinder et al. |
| 2016/0188145 | A1* | 6/2016 | Vida ...................... B60K 35/00 715/745 |
| 2017/0041189 | A1* | 2/2017 | Aswathanarayana .......... H04L 41/0806 |
| 2018/0052671 | A1* | 2/2018 | Venkatesan ............ G06F 21/10 |

OTHER PUBLICATIONS

Ferrer, Ana Juan, David García Pérez, and Román Sosa González. "Multi-cloud platform-as-a-service model, functionalities and approaches." Procedia Computer Science 97 (2016): 63-72. (Year: 2016).*

Chapman, Clovis, et al. "Software architecture definition for on-demand cloud provisioning." Cluster Computing 15.2 (2012): 79-100. (Year: 2012).*

"Hybrid IT and the Digital Enterprise—2016 Research Agenda," 451 Research, Dec. 23, 2015, https://451research.com/report-short?entityId=87721&referrer=marketing.

Unknown, "5 Reasons to Adopt Hybrid Cloud Storage", Cloudian, 2017, https://cloudian.com/wp-content/uploads/2017/02/cloudian_5-Reasons_Hybrid-Cloud-Google; Nov. 17, 2016.

* cited by examiner

ORACLE JD Edwards Provisioning Console

Oracle JD Edwards Deployment — 709

< Back

Deployment Status — 786 jdeDatabase log details:

| Task Name | Status |
|---|---|
| ▽ jdeDatabase | |
| ⊕ Install JDK | ⊘ |
| ⊕ Install Server Manager Agent | ⊘ |
| ⊕ Distribute JDE Database Component to Server Manager Agent | ⊘ |
| ⊕ Create Database Server Instance in Server Manager | ⊘ |
| ▽ jdeEnterprise | |
| ⊕ Install JDK | ⊘ |
| ⊕ Install Server Manager Agent | ⊘ |
| ⊕ Install Oracle 32-bit Database Client | ⊘ |
| ⊕ Copy Database TNSNAMES.ORA File | ⊘ |
| ⊕ Distribute Tools Component to Server Manager Agent | ⊘ |
| ⊕ Distribute Apps Component to Server Manager Agent | ⊘ |
| ⊕ Create Database Server Instance in Server Manager | ⊘ |
| ⊕ Configure INI | ⊘ |

Successful deployment status of Database and Enterprise server

FIG. 7I

ON-PREMISES AND CLOUD-BASED SOFTWARE PROVISIONING

FIELD

One embodiment is directed generally to software provisioning, and in particular, to on-premises and cloud-based software provisioning.

BACKGROUND INFORMATION

With the growing popularity of the "cloud," computer software is moving from "on-premise" installations to cloud-based systems. Generally, the cloud provides access to software applications, services, platforms, systems, etc., over a network, such as the Internet. Software provisioning is the process of installing, configuring, and making a software resource available to users.

For example, provisioning Enterprise Resource Planning (ERP) software includes the deployment and configuration of a number of software components, such as an operating system, database software, mid-tier software, application software, server software, etc. Each software resources is provisioned using a graphical user interface (GUI) that has been customized based on deployment location, i.e., on-premises or cloud-based, and deployment platform, i.e., the hardware and software environment in which the software resource will be executing. The multiplicity of custom GUIs leads to unnecessary technical complexity for users as well as developers. Users must learn and master a different GUI for each deployment location and platform, which leads to confusion and errors when switching between those interfaces, while developers must write, test and maintain multiple code bases to support each GUI and platform.

Accordingly, a technical solution is needed to solve the technical problems associated with provisioning on-premises and cloud-based software resources.

SUMMARY

Embodiments of the present invention advantageously provide a computer-readable medium, method and system for provisioning a software application on-premises or in the cloud.

An instance of a provisioning object is created and initialized, and a graphical user interface (GUI) is generated. The GUI includes a home window, a configure window, an orchestrate window and a deploy window. The orchestrate window includes a plurality of popup windows. The configure window and the popup windows include widgets to receive provisioning parameters. The provisioning parameters are received from the GUI. The provisioning parameters indicate whether to deploy the software application on a local network or a remote network. A location object and a deployment object are created and initialized based on the provisioning parameters. The location object includes an on-premises object for a local network deployment or a cloud object for a remote network deployment. A command to deploy the software application is received from the GUI, and the software application is deployed to a local network or a remote network using the provisioning object, the location object and the deployment object.

BRIEF DESCRIPTION OF THE DRAWINGS

FIGS. 7A to 7J depict a graphical user interface (GUI) that provides a provisioning console for on-premise and cloud-based software application deployment, in accordance with an embodiment of the present invention.

DESCRIPTION

A typical on-premises software deployment process for ERP software first installs an operating system on one or more target servers. Based on the type of operating system, installation packages are obtained for the database software, mid-tier software, enterprise server software, HTML server software, server manager software, etc. Installers are invoked, at times manually, to separately install and configure certain components, such as the database software, the mid-tier software, the server manager software, etc. Various ERP components are then deployed and configured via the server manager, and the user provides inputs at various stages of the installation process.

A typical cloud software deployment process for ERP software first obtains a cloud resource, such as a virtual machine, with the required configuration, including processor, memory, storage, operating system, etc. Using REST APIs, the user configures various cloud services for the database, the mid-tier, the server manager, etc. If the required services are not available as cloud services, the user must provision the required software components on cloud resources after obtaining and invoking the appropriate installers. Using REST APIs, various ERP components are then deployed and configured via the server manager, and the user provides inputs at various stages of the installation process.

These typical on-premises and cloud deployment processes are technically complex for users as well as developers, employing a multiplicity of GUIs and requiring multiple code bases to support each GUI and platform.

Embodiments of the present invention advantageously provide a multi-platform/cloud services provisioning infrastructure with a unified GUI for on-premise and cloud deployments. The provisioning infrastructure incorporates object oriented programming, including such features as multiple inheritance, polymorphism, etc., to avoid code duplication, and provides a uniform GUI to the end user regardless of the nature of software deployment. The provisioning infrastructure is extensible, reusable and automated, and, in certain embodiments, the required software components may be included in a single package that is used for both on premise and cloud deployments. In many embodiments, the user first provides the necessary provisioning parameters, and then the provisioning infrastructure performs the deployment process without any additional user intervention.

Figure 1:
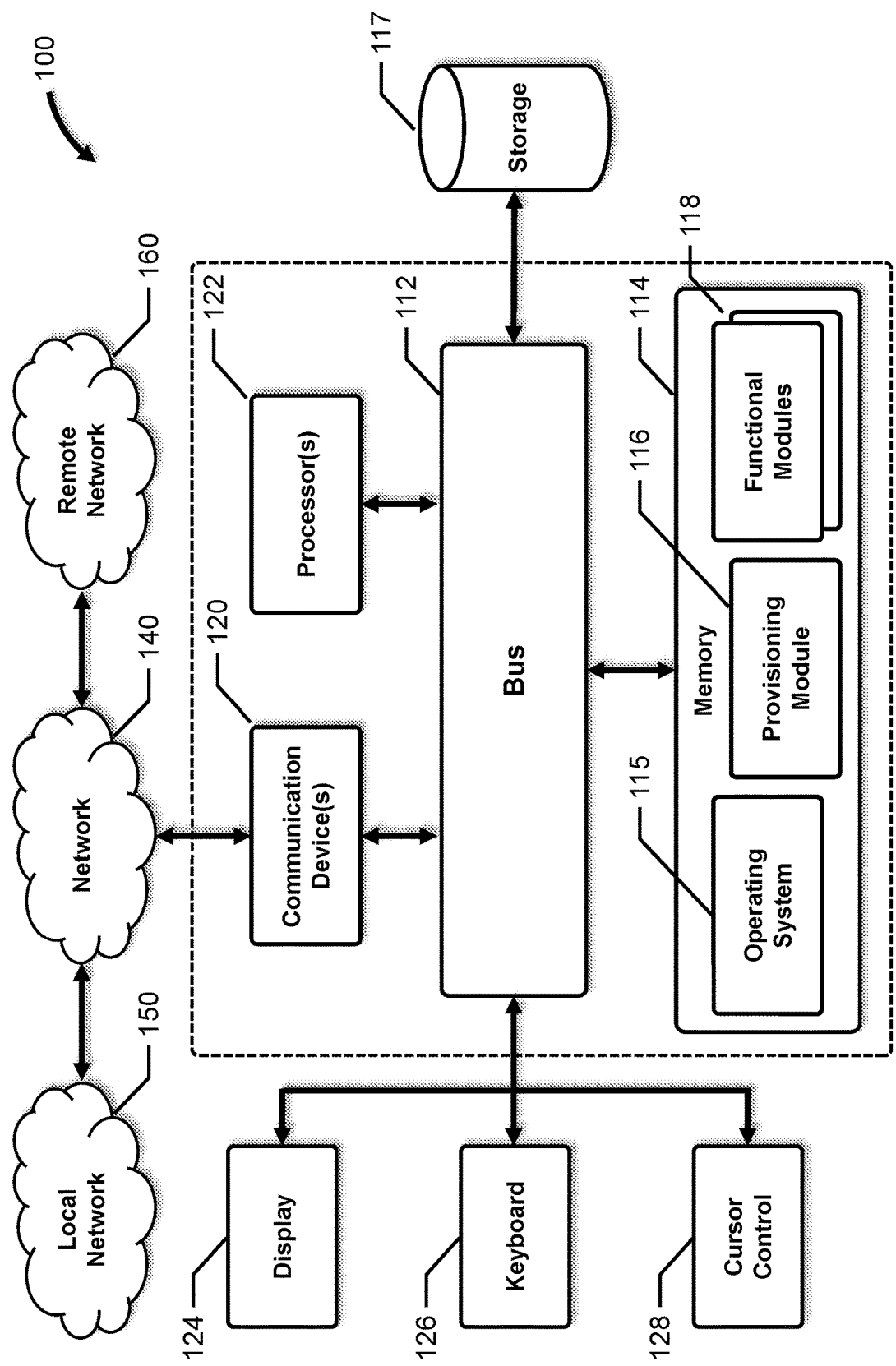
FIG. 1 presents a block diagram of a computer system, according to an embodiment of the present invention.

FIG. 1 is a block diagram of a computer system 100, in accordance with an embodiment of the present invention. Although shown as a single system, the functionality of system 100 can be implemented as a distributed system. Further, the functionality disclosed herein can be implemented on separate servers or devices that may be coupled together over a network. Further, one or more components of system 10 may not be included. For example, for functionality as a user client, system 10 may be a smartphone that includes a processor, memory, a display and other components, but may not include one or more of the components shown in FIG. 1.

System 100 includes a bus 112 or other communication mechanism for communicating information, and a processor 122 coupled to bus 112 for processing information. Processor 122 may be any type of general or specific purpose processor. System 100 further includes a memory 114 for storing information and instructions to be executed by processor 122. Memory 114 can be comprised of any combination of storage devices, such as, for example, random access memory ("RAM"), read only memory ("ROM"), static storage devices such as a magnetic or optical disk, or any other type of computer readable media.

System 100 further includes a communication device 120, such as a network interface card, to provide access to one or more networks 140, 150, 160. In certain embodiments, network 140 is a network that is directly connected to system 100, such as an Ethernet network, a WiFi network, etc., local network 150 may be a local extension of network 140, such as a local area network (LAN), etc., and remote network 160 may be indirectly connected to system 100 through network 140 and/or network 150, such as a wide area network (WAN), the Internet, etc.

Computer readable media may be any available media that can be accessed by processor 122 and includes both volatile and nonvolatile media, removable and non-removable media, and communication media. Communication media may include computer readable instructions, data structures, program modules, etc., and includes any information delivery media. Processor 122 is further coupled via bus 112 to a display 124, such as a Liquid Crystal Display ("LCD"). A keyboard 126 and a cursor control device 128, such as a computer mouse, may be coupled to bus 112 to enable a user to interface with system 100.

In one embodiment, memory 114 stores software modules that provide functionality when executed by processor 122. The modules include an operating system 15 that provides operating system functionality for system 100. The modules further include a provisioning module 116 for provisioning software, and other functionality disclosed herein. System 100 can include other functional modules 118, such as, for example, a database management system, etc. Alternatively, provisioning module 116 may be included within one of the functional modules 118. A storage device 117, such as a hard disk, may be coupled to bus 112 to provide, inter alia, centralized storage for operating system 115, provisioning module 116, functional modules 18, data files, documents in various formats. System 100 can be part of a larger system, and one or more clients may connect to the communication device 120 through one or more intervening networks (not shown), such as, for example, a Local Area Network (LAN), a Wide Area Network (WAN), a wireless network (Wi-Fi), the Internet, etc.

Figure 2:
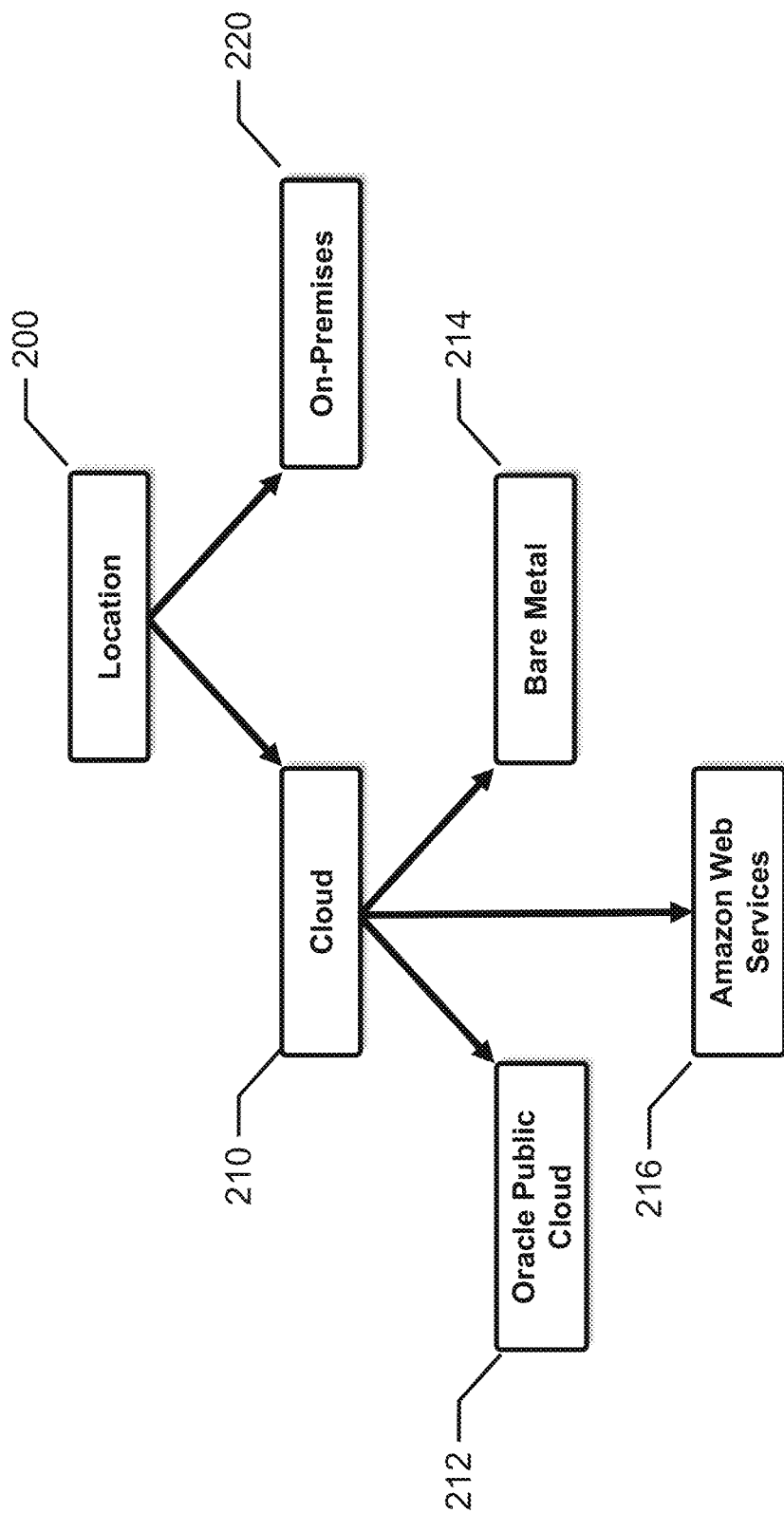
FIG. 2 depicts a location object, in accordance with an embodiment of the present invention.
Figure 3:
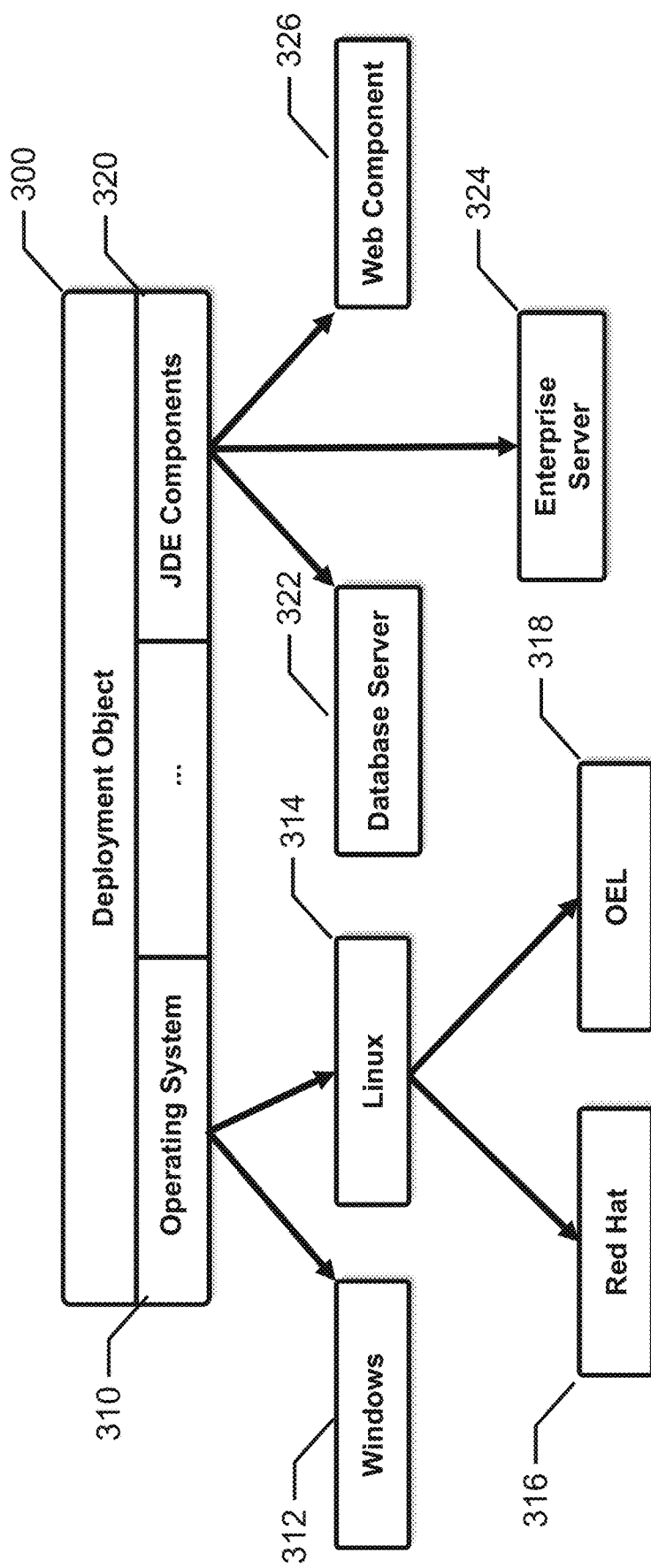
FIG. 3 depicts a deployment object, in accordance with an embodiment of the present invention.
Figure 4:
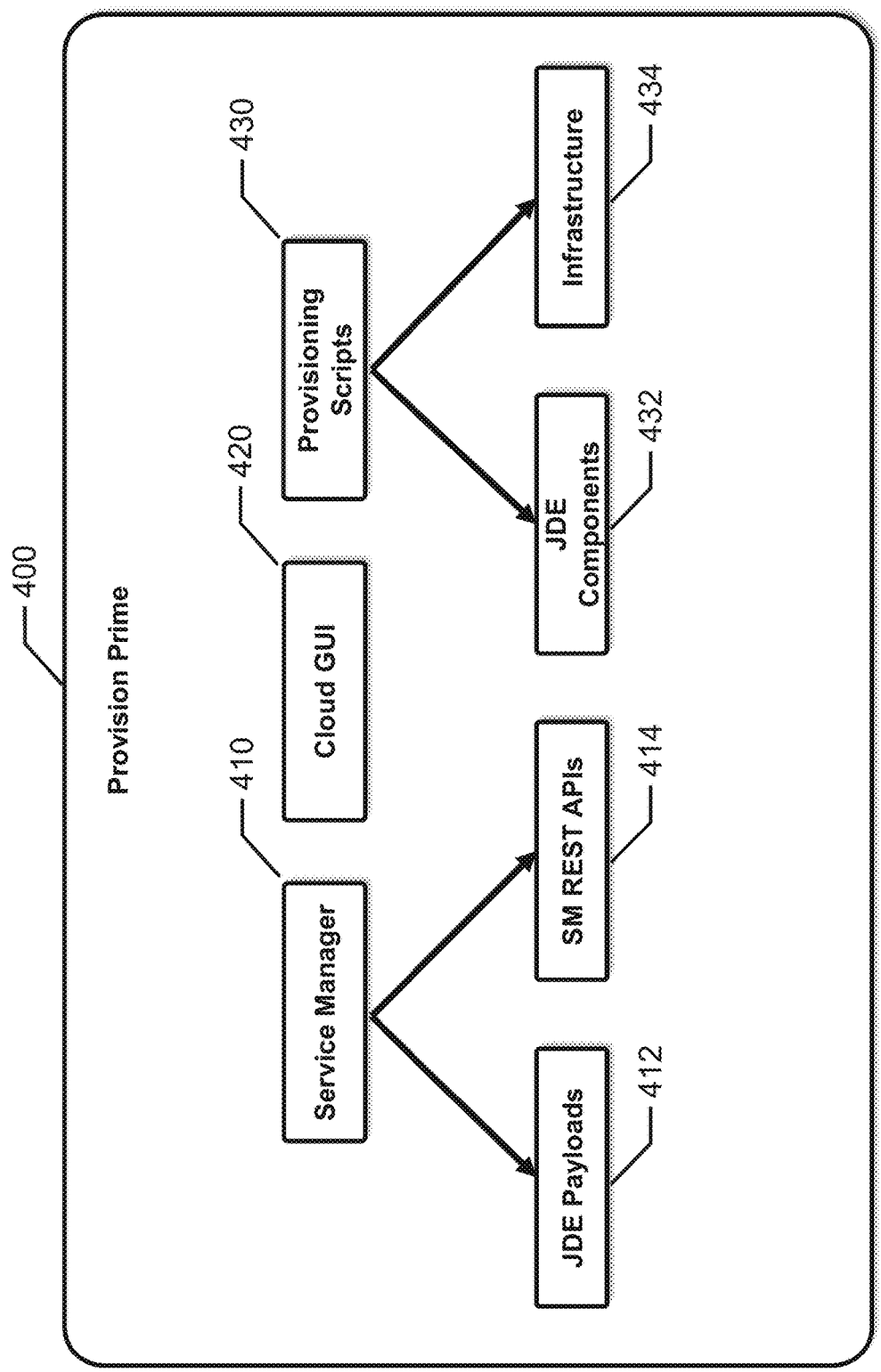
FIG. 4 depicts a provision prime object, in accordance with an embodiment of the present invention.

The multi-platform/cloud services provisioning infrastructure incorporates various objects, as depicted in the embodiments of FIGS. 2-4.

FIG. 2 depicts a location object 200, in accordance with an embodiment of the present invention. Location object 200 has two children, i.e., cloud object 210 and on-premises object 220. Cloud object 210 has three children, i.e., Oracle public cloud 212, Amazon web services 216 and bare metal 218. Generally, location object 200 represents the type of deployment and associated details and parameters for that deployment.

FIG. 3 depicts a deployment object 300, in accordance with an embodiment of the present invention. Deployment object 300 includes at least an operating system object 310 and a JDE components object 320. Operating system object has two children, i.e., Windows object 312 and Linux object 314. Linux object 314 has two children, i.e., Red Hat object 316 and Oracle Enterprise Linux (OEL) object 318. JDE components object 320 has three children, i.e., database server object 322, enterprise server object 324 and web component object 326. Generally, deployment object 300 is a container that contains information about multiple parameters, such as the type of operating system, the type of component being deployed, etc. Objects may be further refined at each level of the hierarchy. For example, for a new version of OEL, the relevant OEL object is simply expanded to add additional functionality that is specific to the new version of OEL. This approach advantageously provides greater code sharing for common tasks, and requires fewer lines of code to be added thereby reducing the development cycle and requiring less testing time for the new version of OEL.

FIG. 4 depicts a provision prime object 400, in accordance with an embodiment of the present invention. Provision object 200 includes three objects, i.e., service manager object 410, cloud GUI object 420 and provisioning scripts object 430. Service manager object has two children, i.e., JDE payload object 412 and SM REST APIs object 414. Provisioning scripts object has two children, i.e., IDE components object 432 and infrastructure object 434.

Figure 5:
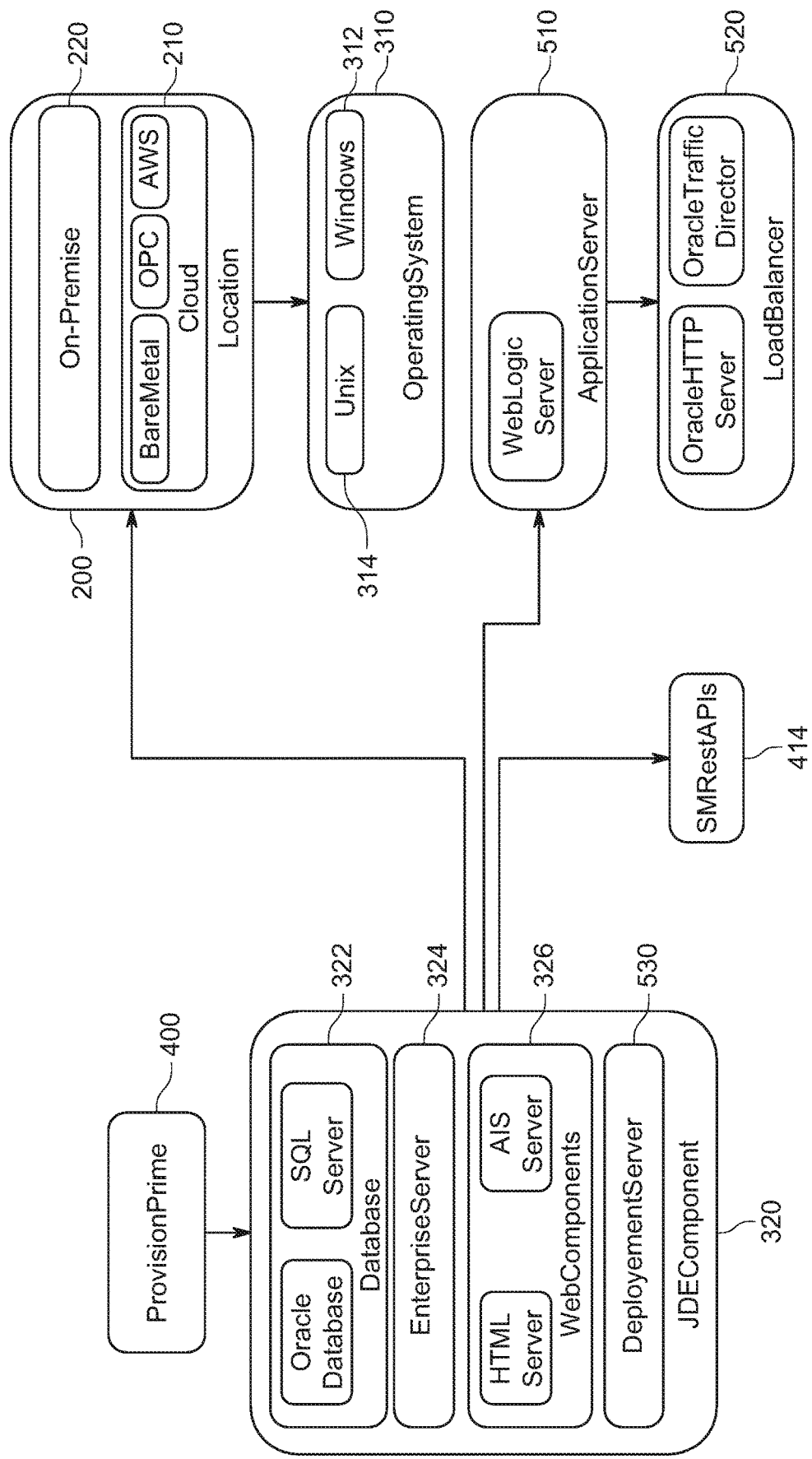
FIG. 5 depicts a different view of the relationship of various objects incorporated by the provisioning infrastructure, in accordance with an embodiment of the present invention.

FIG. 5 depicts a different view of the relationship of various objects incorporated by the multi-platform/cloud services provisioning infrastructure, in accordance with an embodiment of the present invention. Location object 200, operating system object 310, JDE component object 320, and provision prime object 400 are depicted, as well as application server object 510, load balancer object 520 and deployment server object 530. Additionally, cloud object 210, on-premises object 220, Windows object 312, Linux object 314, database server object 322, enterprise server object 324 and web component object 326 are also depicted.

Figure 6:
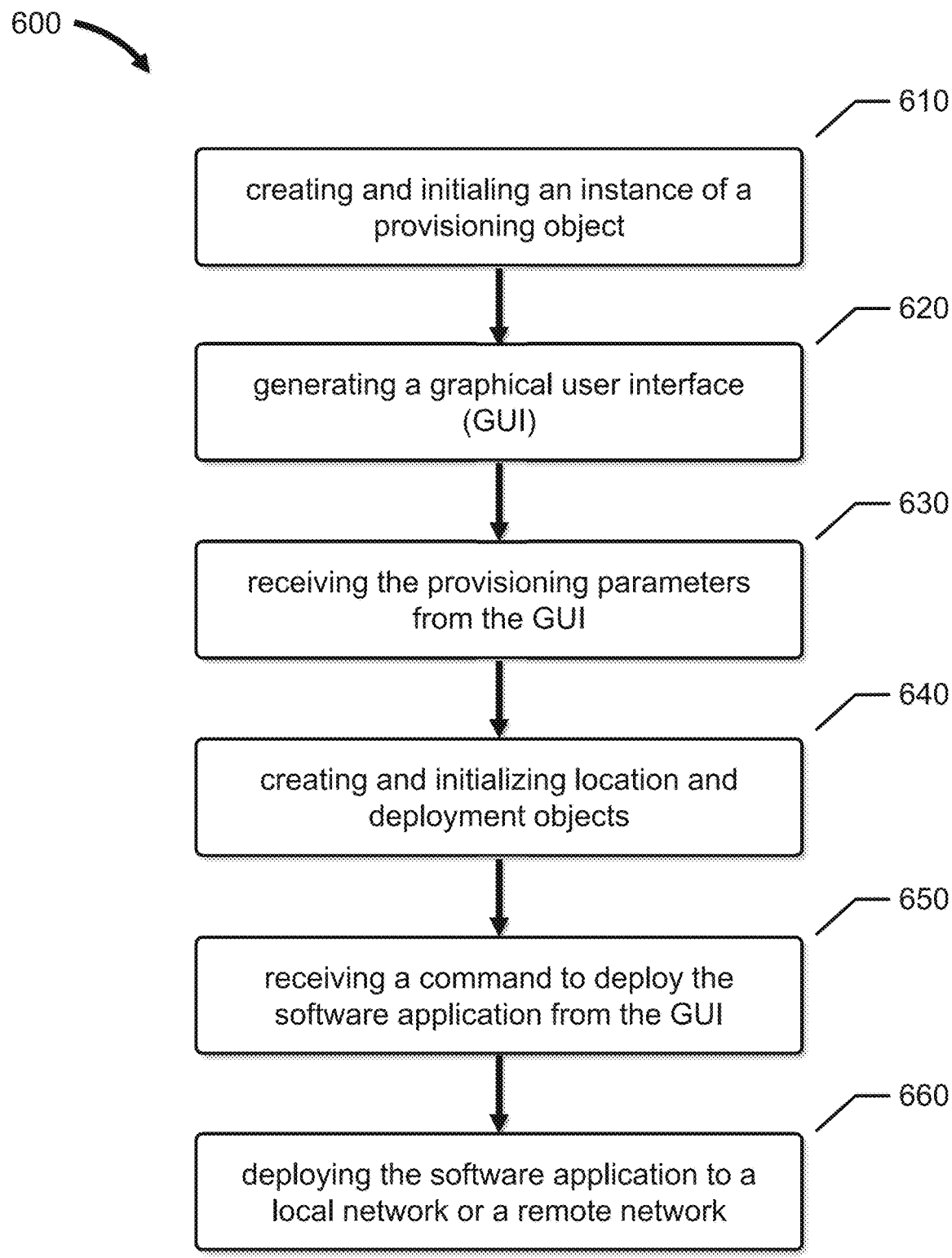
FIG. 6 depicts a process for provisioning a software application on-premises or in the cloud, in accordance with an embodiment of the present invention.

FIG. 6 depicts a process 600 for provisioning a software application on-premises or in the cloud, in accordance with an embodiment of the present invention. FIGS. 7A to 7J depict a graphical user interface (GUI) 700 that provides a provisioning console for on-premise and cloud-based software application deployment, in accordance with an embodiment of the present invention.

An instance of a provisioning object 400 is created and initialized (610).

A GUI 700 is generated (620). GUI 700 includes home window 710, configure window 720, orchestrate window 730 and deploy window 780.

Home window 710 includes, inter alia, configure panel 711, orchestrate panel 713 and deploy panel 715. Configure panel 711 includes information related to the configuration of the provisioning process, as well as the configuration status 712, such as, for example, not configured, configured, etc. Orchestrate panel 713 includes information related to the orchestration of the provisioning process, as well as the orchestration status 714, such as, for example, not configured, configured, etc. Deploy panel 715 includes information related to the deployment of the software application, as well as the deployment status 716, such as, for example, not started, in progress, completed, etc.

Configure window 720 includes, inter alia, JDE server manager details panel 720 that receives provisioning parameters from the user. These parameters are associated with a server manager process, and may include, for example, a user name, a password, a Representational State Transfer (REST) or Symantec Management Client (SMC) endpoint, etc. The user name may be input through user name text box 721, the password may be input through password text box 722, and the REST or SMC endpoint may be input through SMC endpoint text box 723, or, alternatively, through a drop-down list presenting one or more REST or SMC endpoints. The REST or SMC endpoint is typically input as a Uniform Resource Locator (URL), such as, for example, https://129.146.22.204:8998/manage/rr.

Orchestrate window 730 includes, inter alia, service types panel 725, add new server widget 731 and summary panel 732. The service types panel 725 has several selectable widgets that allow information to be displayed within orchestrate window 730 or input through several pop-up windows. For example, FIG. 7C indicates that "Servers" icon 726 has been selected, which displays a summary of server instances within summary panel 732. Similarly, selection of "Database Server" icon 727, "Enterprise Server" icon 728, "Web Server" icon 729 or "Deployment Server" icon 730 will display relevant information within summary panel 732 (not depicted).

Additionally, the subsequent selection of "New Server" icon 731 will cause a relevant pop-up window to be displayed over orchestrate window 703, as depicted in FIGS. 7D, 7E, 7F and 7G, and described in more detail below. For example, selection of "New Server" icon 731 when "Database Server" icon 727 is highlighted will cause the add database pop-up window 704 to be displayed. Similarly, selection of "New Server" icon 731 when "Enterprise Server" icon 728 is highlighted will cause the create enterprise server pop-up window 705 to be displayed, selection of "New Server" icon 731 when "Web Server" icon 729 is highlighted will cause the weblogic cloud instance pop-up window 706 to be displayed, and selection of "New Server" icon 731 when "Deployment Server" icon 730 is highlighted will cause the create deployment server service pop-up window 707 to be displayed.

Add database instance pop-up window 704 includes several panels to receive provisioning parameters relating to a database server instance from the user. Server configuration panel 740 includes instance name text box 741 and host name text box 742. Database configuration panel 743 includes DB admin password text box 744 and net service name text box 745. JDE database configuration panel 746 includes JDE DB install directory text box 747, JDE DB table directory text box 748, JDE DB index directory text box 749, schemas check boxes shared 750 and development 751, and demo data check box development 752.

Create enterprise server pop-up window 705 includes several panels to receive provisioning parameters relating to an enterprise server instance from the user. Server configuration panel 760 includes instance name text box 761 and host name text box 762. Database configuration panel 763 includes database instance pull-down menu 764. Enterprise server preferences panel 765 includes server type batch check box 766 and logic check box 767. Pathcode details panel 768 includes pathcodes check box 769.

WebLogic cloud instance pop-up window 706 includes several panels to receive provisioning parameters relating to a web server instance from the user. Server configuration panel 770 includes instance name text box 771, host name text box 772, port text box 773, type pull-down menu 774 and HTML server instance pull-down menu 775. WebLogic details panel 776 includes user name text box 777, password text box 778, admin port text box 779, install path text box 780 and JDK install path 781.

Create deployment server service pop-up window 707 includes several panels to receive provisioning parameters from the user. Server configuration panel 782 includes instance name text box 783, host name text box 784, Windows user text box 785 and Windows password text box 786. Deployment server configuration panel 787 includes location text box 788, installation drive text box 789 and install pathcodes selection boxes 790.

Figure 7A:
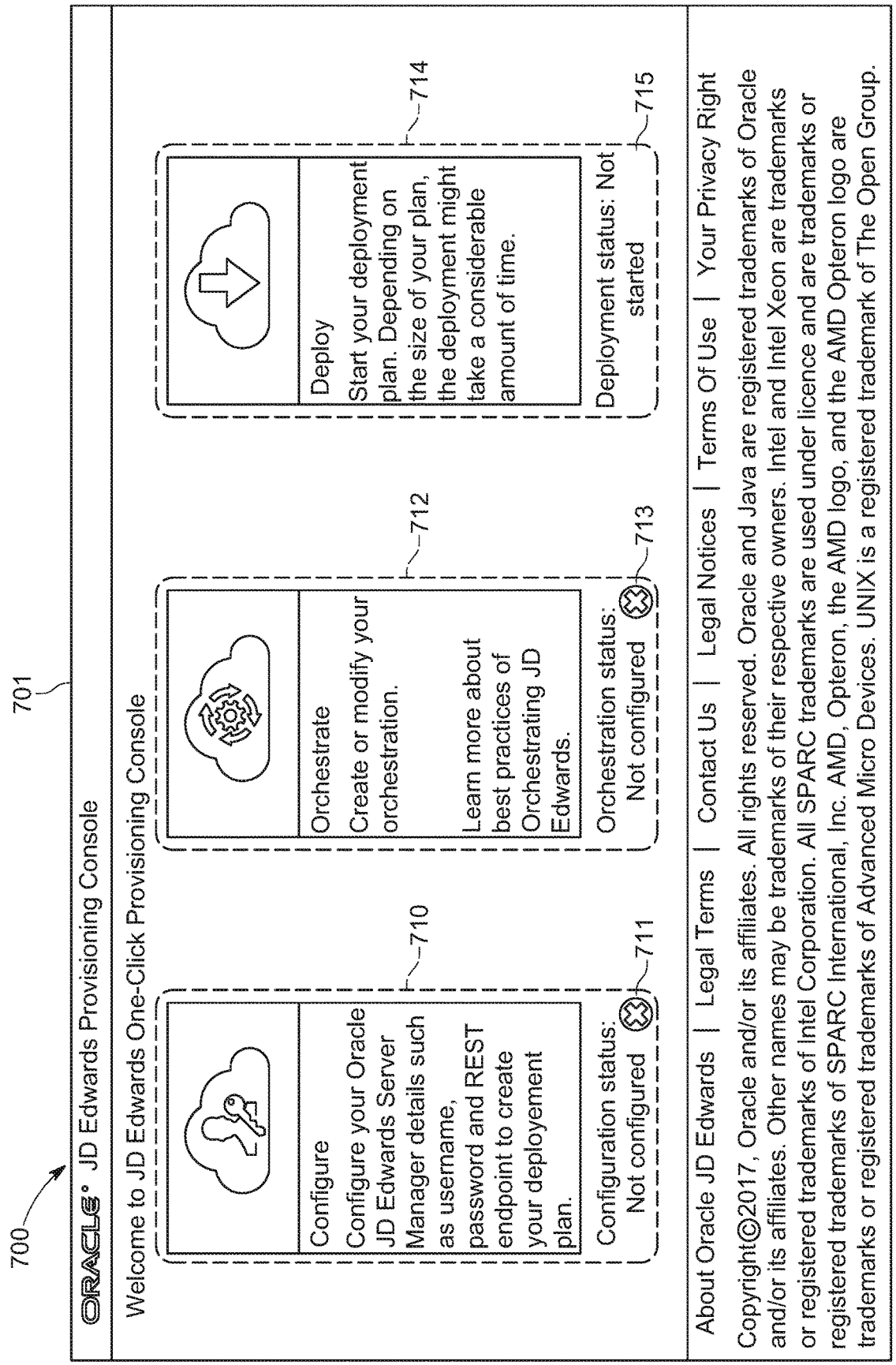
Figure 7B:
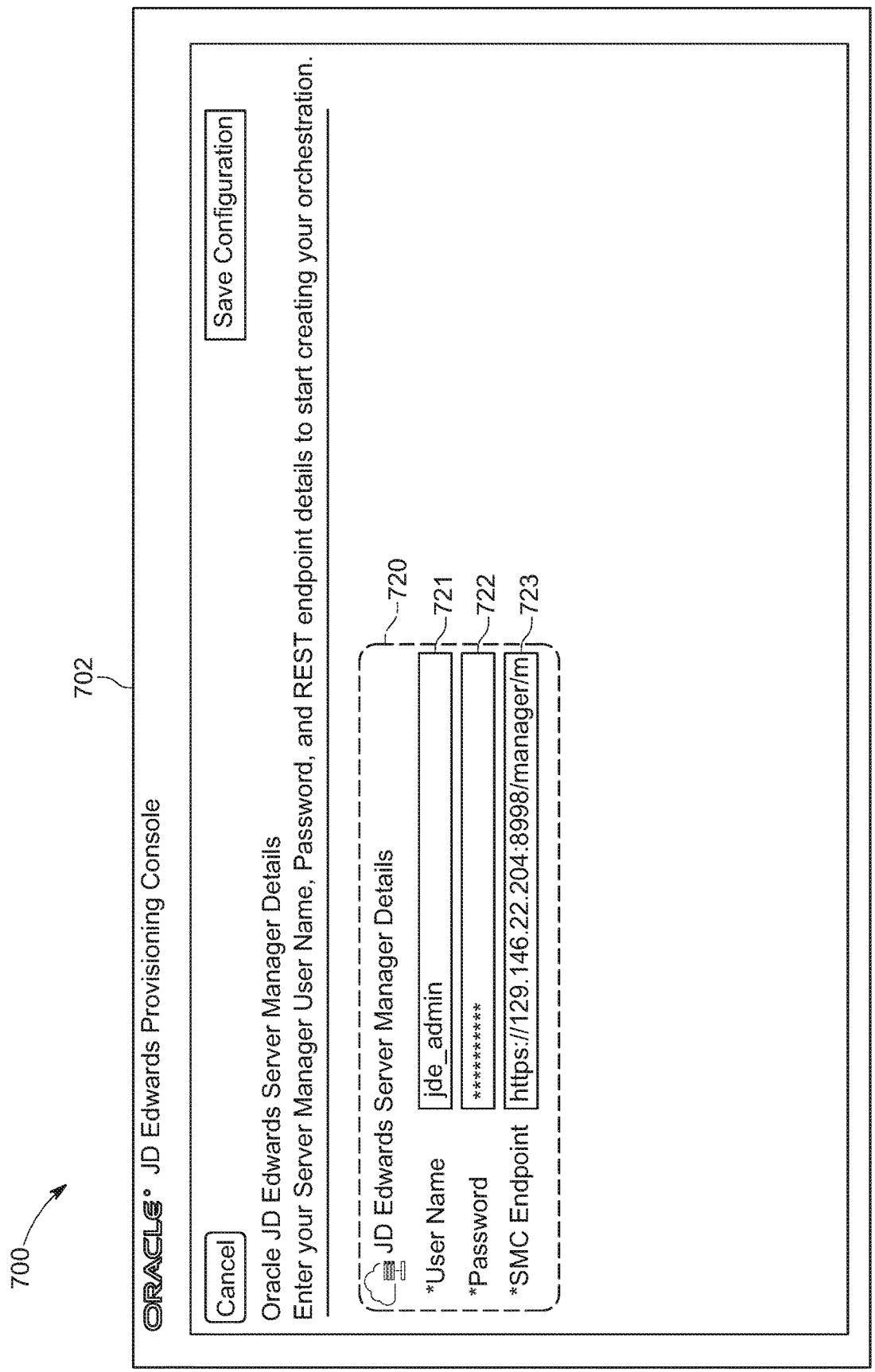
Figure 7C:
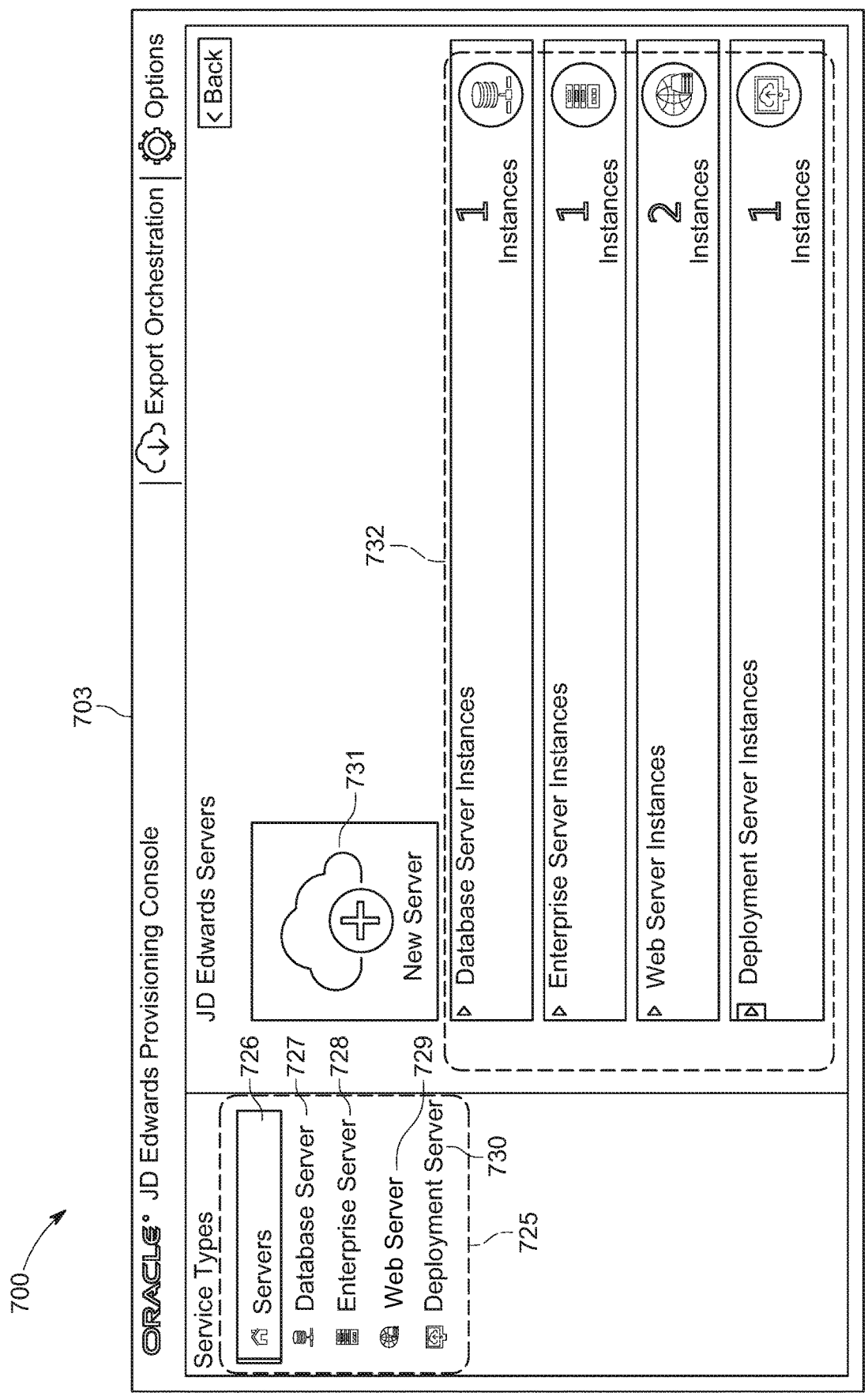
Figure 7D:
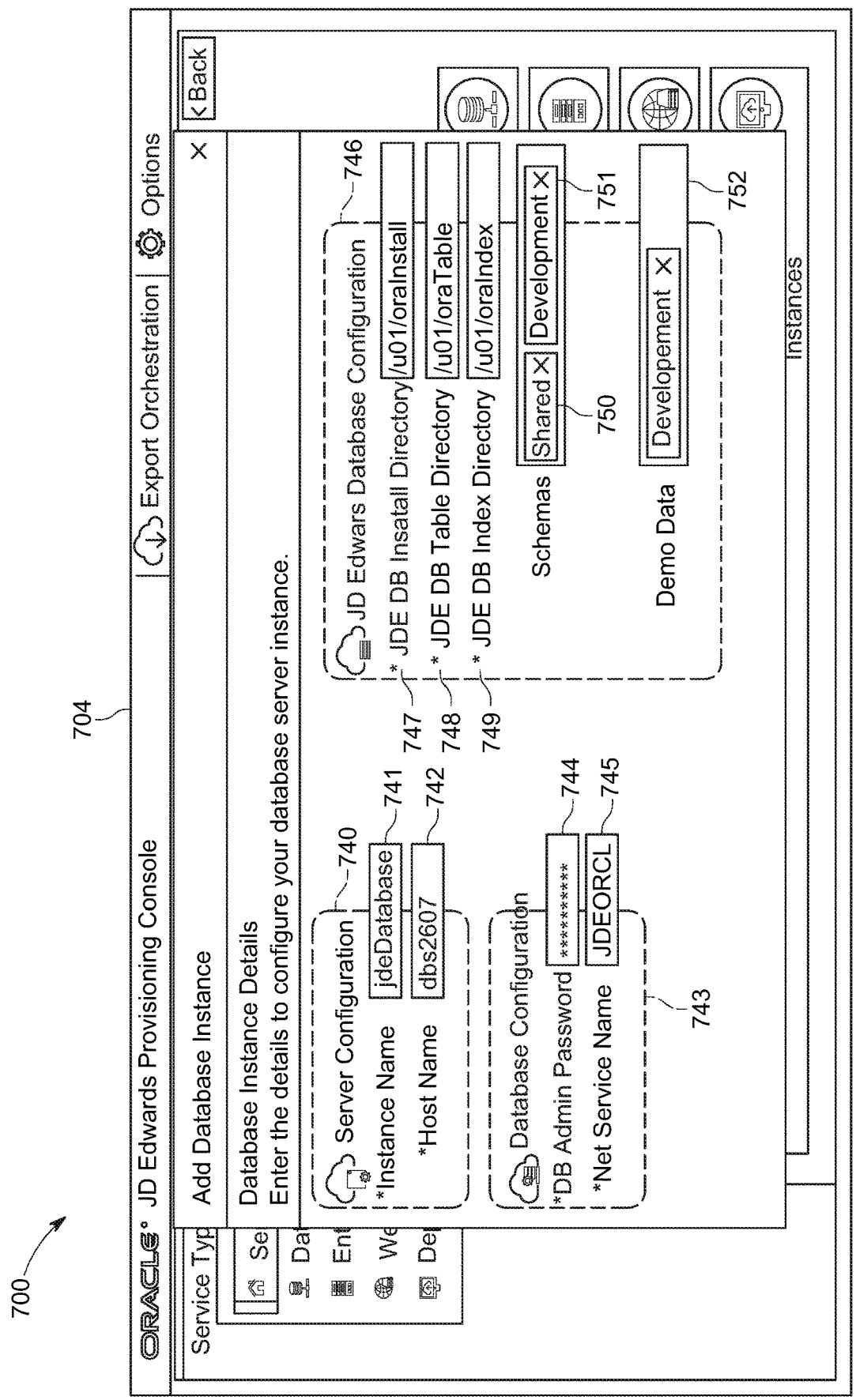
Figure 7E:
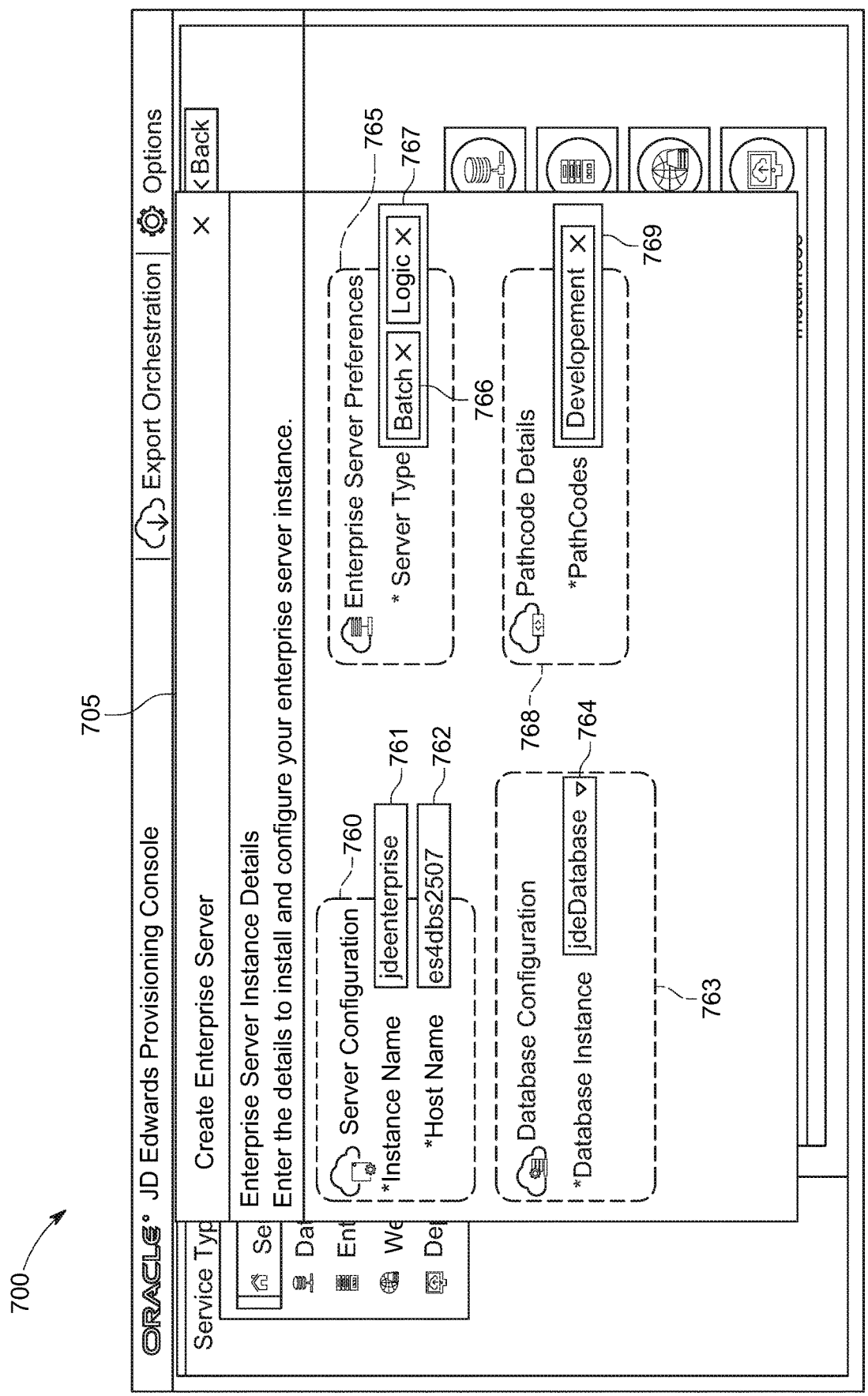
Figure 7F:
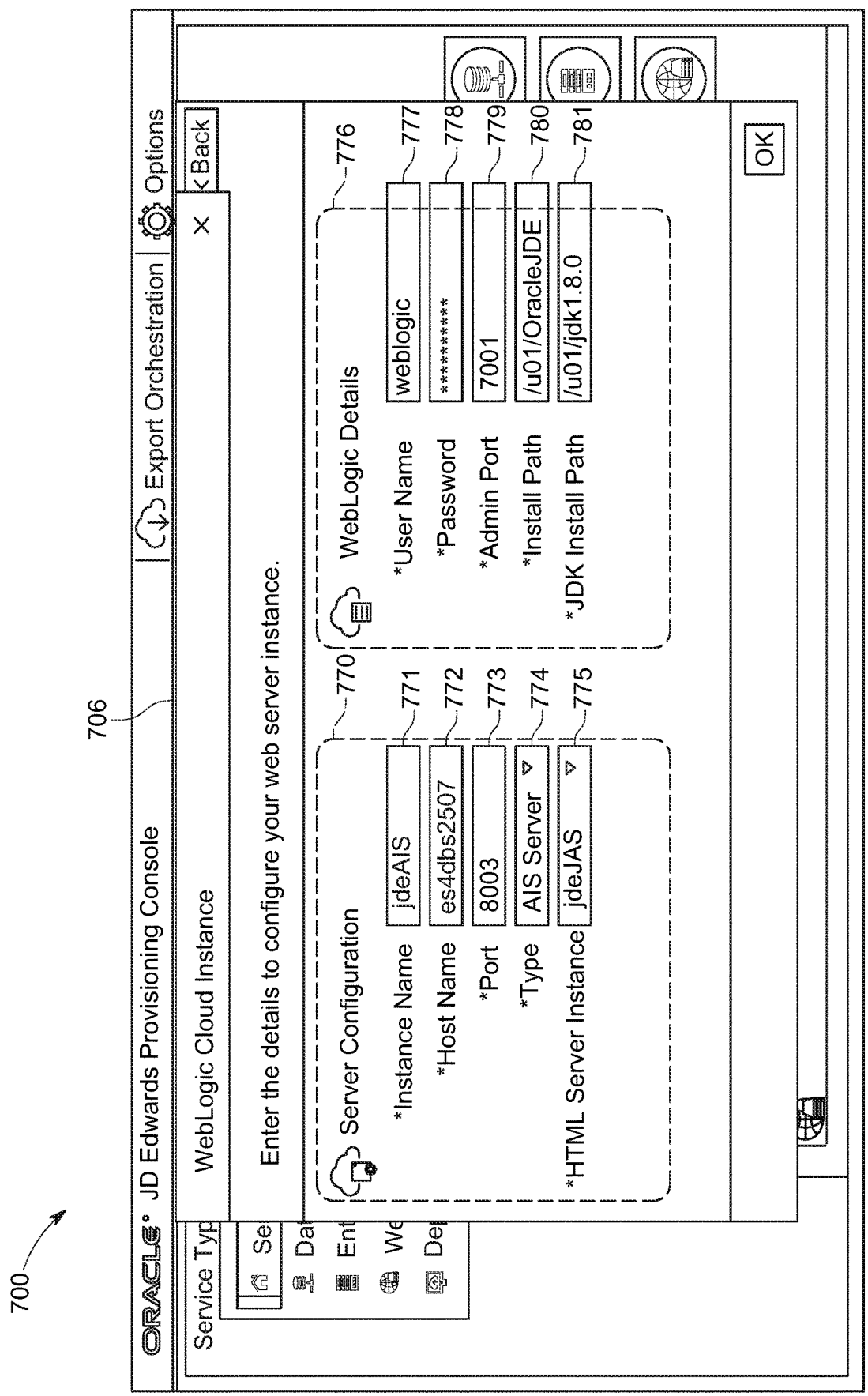
Figure 7G:
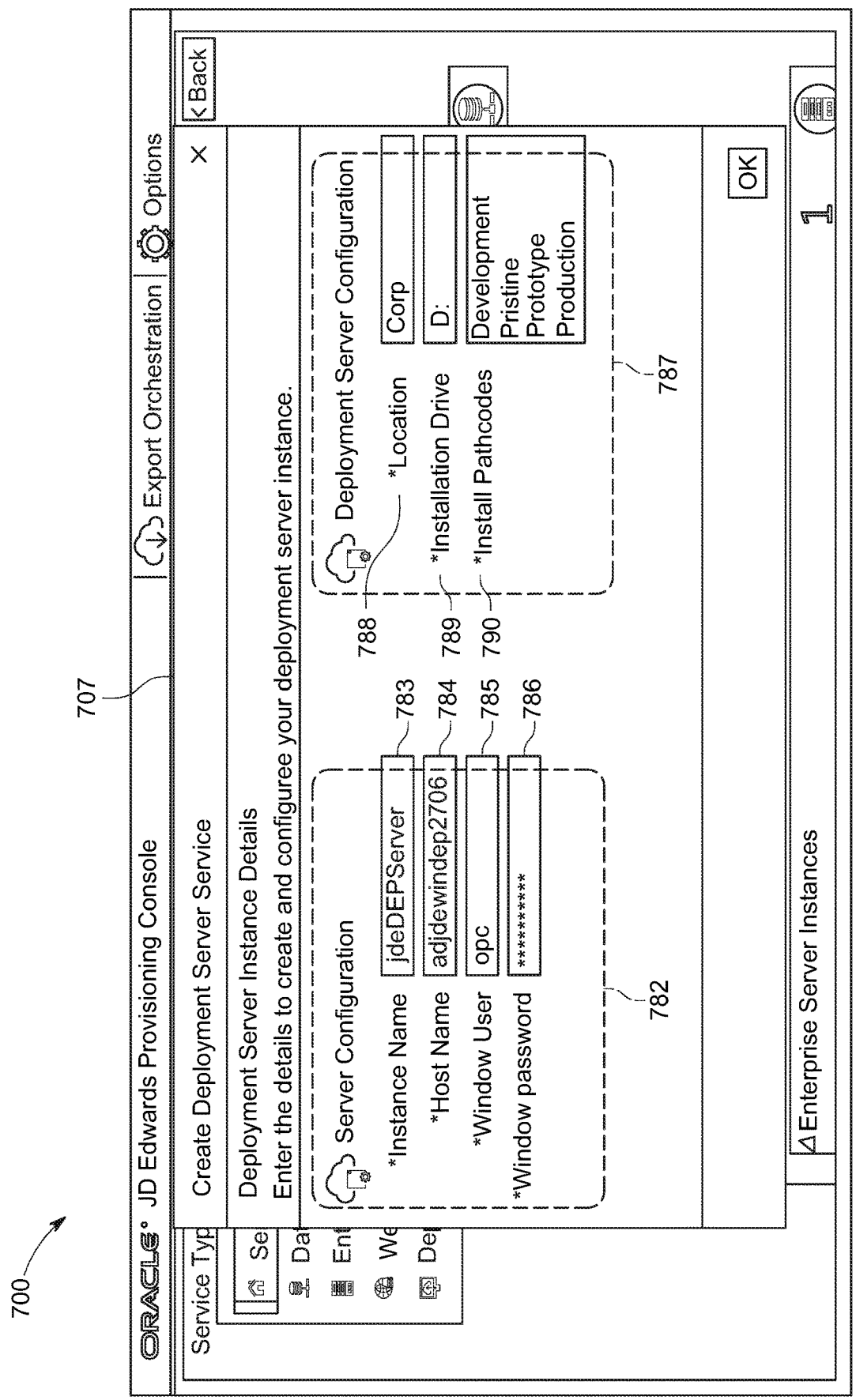
Figure 7H:
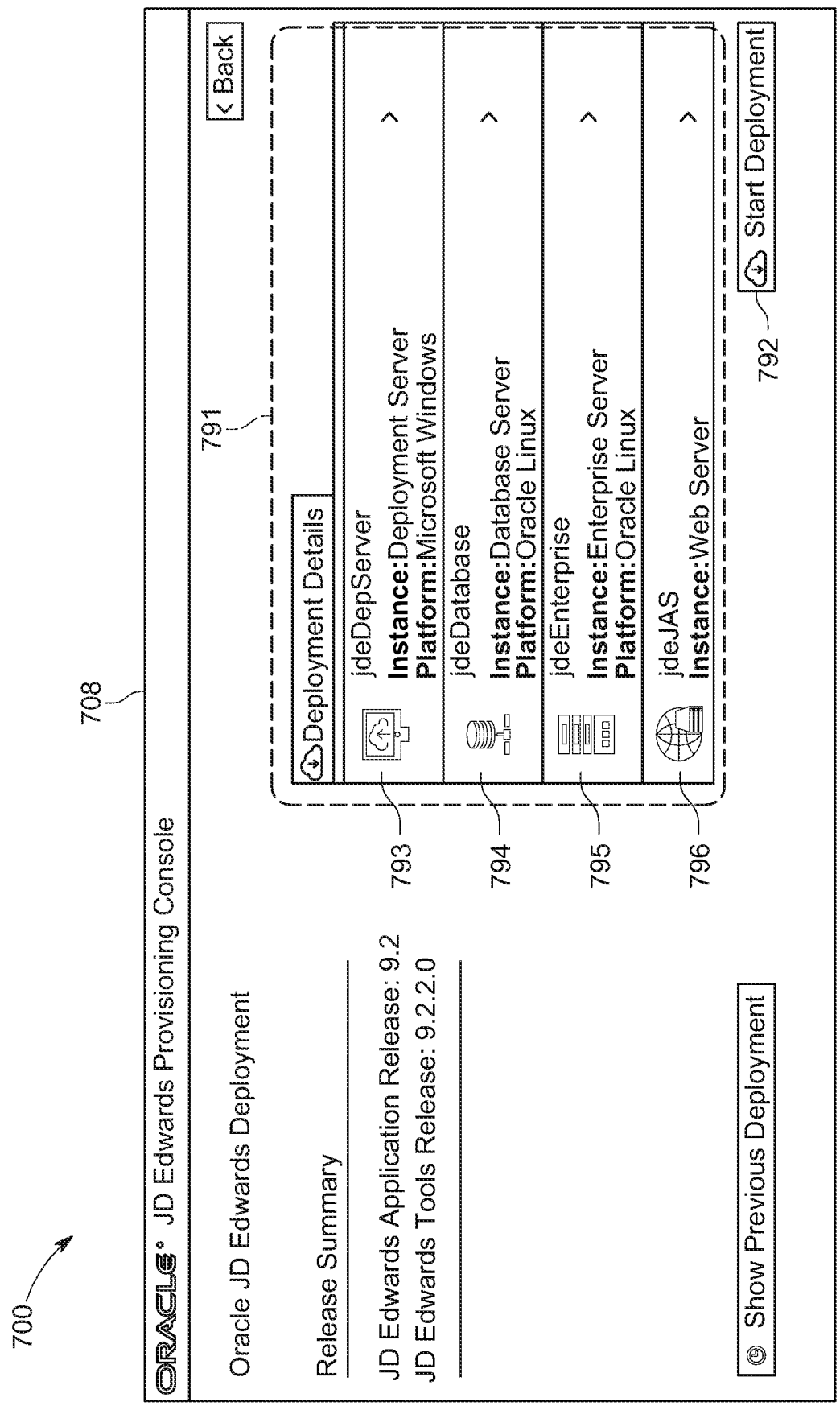

Deploy window 708 includes, inter alia, deployment information panel 791 and start deployment button 792. Deployment information panel 791 generally displays an icon for each server on which software has been deployed. For example, FIG. 7H depicts several icons for an exemplary deployment, including deployment server icon 793, database server icon 794, enterprise server icon 795, web server icon 796, etc. Each icon can be expanded to display additional relevant details.

The provisioning parameters are received (630) from the GUI 700. The provisioning parameters indicates whether to deploy the software application on a local network or a remote network.

A location object 200 and a deployment object 300 are created and initialized (640) based on the provisioning parameters. The location object 200 includes an on-premises object 220 for a local network deployment (i.e., on-premises) or a cloud object 210 for a remote network deployment (i.e., cloud-based).

A command to start the deployment of the software application is received (650) from the GUI 700.

Figure 7J:
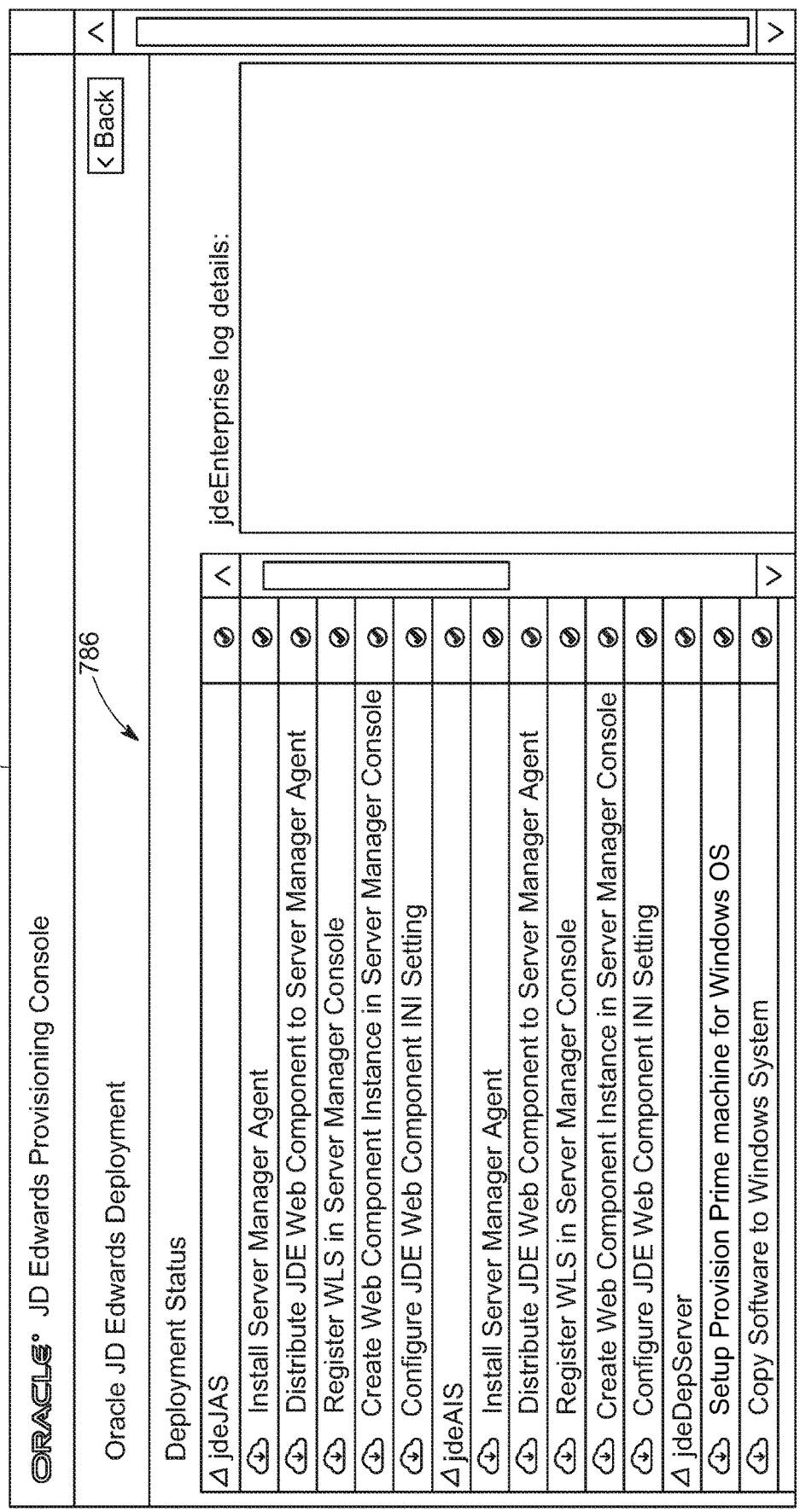

The software application is deployed (660) to a local network or a remote network using the provisioning object 400, the location object 200 and the deployment object 300. During deployment, the deploy window 780 displays a deployment status 786 of each component of the software application. FIG. 7I depicts a successful deployment status of a Database and Enterprise server, while FIG. 7J depicts a successful deployment status of a Web and Deployment server.

If the required servers, such as, for example, the Database server(s), the mid-tier server(s), the Enterprise E1 server(s), etc., are to be deployed on a local network, the user provides input parameters for an on-premise installation. If the required servers are to be deployed on a remote network, the user provides input parameters for a cloud installation. Based on the connectivity information and credentials provided by the user, the multi-platform/cloud services provisioning infrastructure automatically detects whether an on-premise or cloud deployment is indicated, and creates the appropriate objects.

FIGS. 8A, 8B, 9A, 9B, 10 and 11 depict several class diagrams for the multi-platform/cloud services provisioning infrastructure, in accordance with embodiments of the present invention.

The class diagrams illustrate the structure of the each main class, including the constituent classes with their attributes and methods, as well as the relationships among the classes. Each block within the diagram represents a class and contains three components: the name of the class at the top of the block, the attributes of the class in the middle of the block, and the methods or operations executable by the class at the bottom of the block. Each attributes is listed on a separate line in "name: attribute type" format. Each operation is listed on a separate line in "name (input parameter list): return value type" format.

All classes have a name; some classes may not have attributes, other classes may not have operations, and certain class have neither attributes nor operations. In other words, attributes and operations are optional. Specific symbols are prepended to an attribute or method to indicate the visibility of that attribute or method, i.e., e.g., "+" indicates public visibility, "-" indicates private visibility, "#" indicates protected visibility, "/" indicates derived visibility, and "~" indicates package visibility. The arrows indicate inheritance.

Figure 8A:
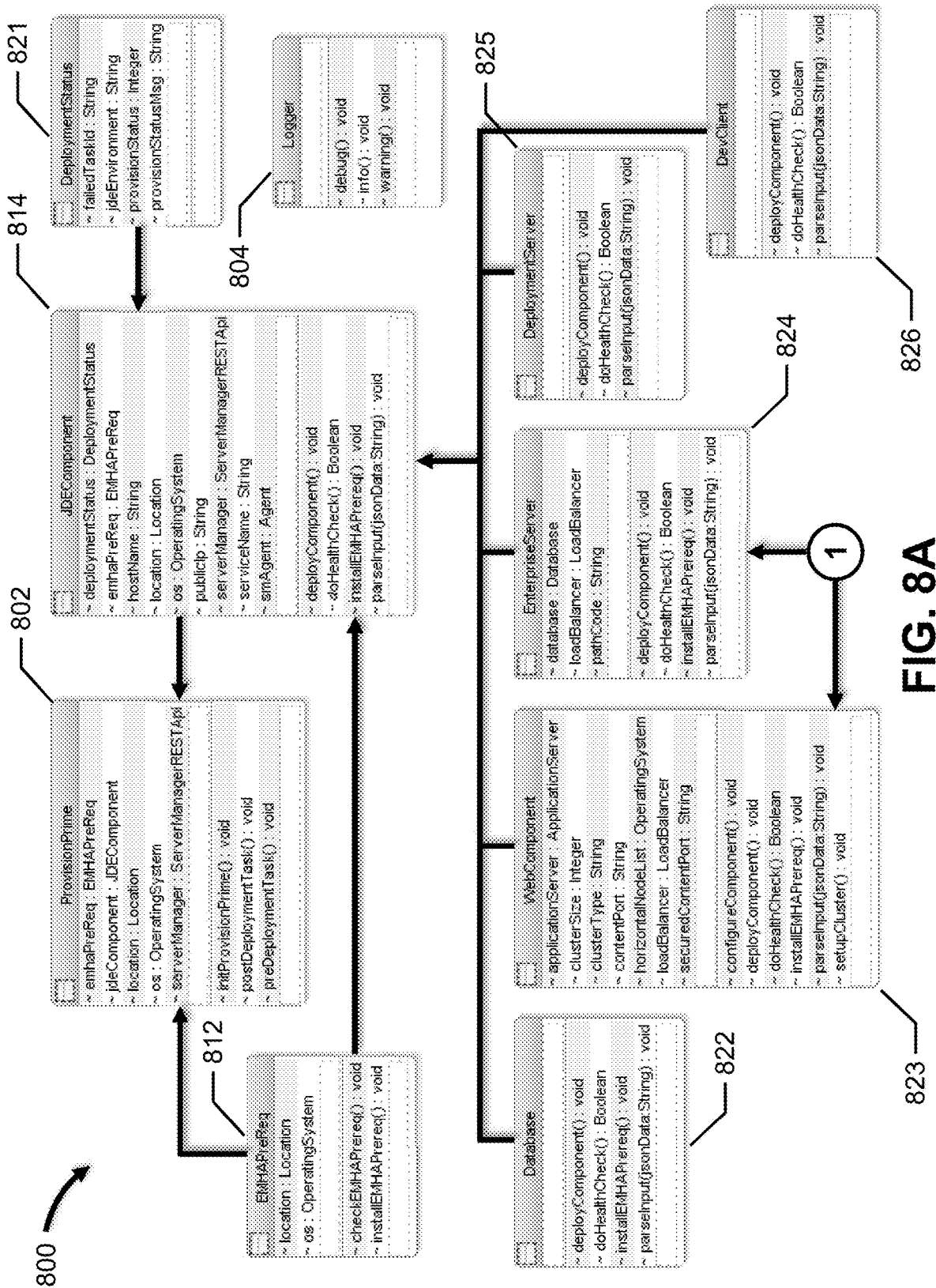
FIGS. 8A, 8B, 9A, 9B, 10 and 11 depict several class diagrams for the multi-platform/cloud services provisioning infrastructure, in accordance with embodiments of the present invention.
Figure 8B:
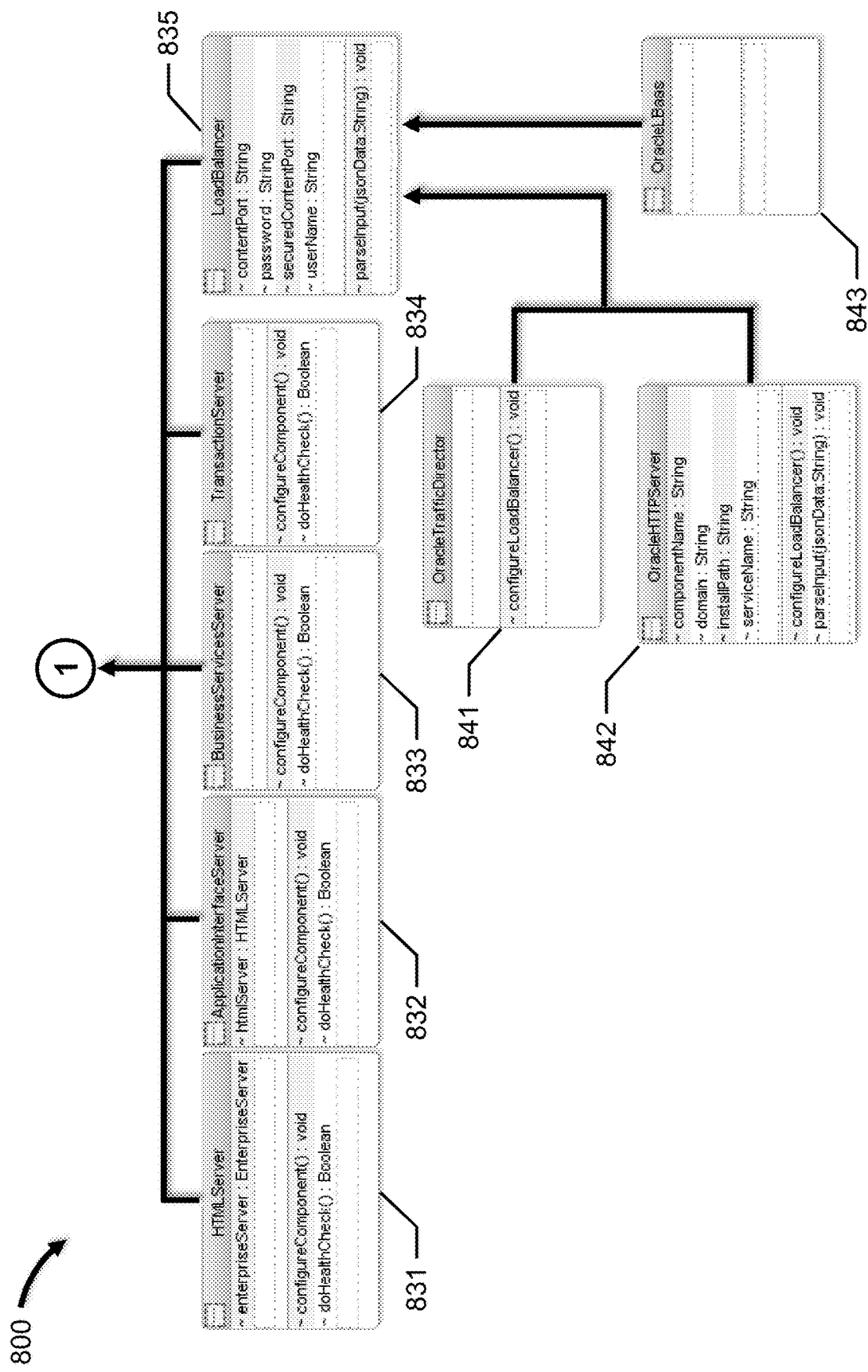

FIGS. 8A and 8B depict provision prime class diagram 800, in accordance with an embodiment of the present invention.

ProvisionPrime class 802 has several attributes and operations. The attributes include ~emhaPreReq of type EMHAPreReq, ~jdeComponent of type JDEComponent, ~location of type Location, ~os of type OperatingSystem, and ~serverManager of type ServerManagerRESTApi. The operations include ~initProvisionPrime( ) having no input parameters and no return value, ~postDeploymentTask( ) having no input parameters and no return value, and ~preDeployentTask( ) having no input parameters and no return value.

Logger class 804 has several operations, including ~debug( ) having no input parameters and no return value, ~info( ) having no input parameters and no return value, and ~warning( ) having no input parameters and no return value.

EMHAPreReq subclass 812 has several attributes and operations. The attributes include ~location of type Location, and ~os of type OperatingSystem. The operations include ~checkEMHAPreeq( ) having no input parameters and no return value, and ~installEMHAPreeq( ) having no input parameters and no return value.

JDEComponent subclass 814 has several attributes and operations. The attributes include ~deploymentStatus of type DeploymentStatus, ~emhaPreReq of type EMHAPreReq, ~hostName of type String, ~location of type Location, ~os of type OperatingSystem, ~publicIp of type String, ~serverManager of type ServerManagerRESTApi, ~serviceName of type String, and ~smAgent of type Agent. The operations include ~deployComponent( ) having no input parameters and no return value, ~doHealthCheck( ) having no input parameters and a Boolean return value, ~installEMHAPrereq( ) having no input parameters and no return value, and ~parseInput( . . . ) having an input parameter jsonData of type String and no return value.

DeploymentStatus subclass 821 has several attributes, including ~failedTaskId of type String, ~jdeEnvironment of type String, ~provisionStatus of type Integer, ~provisionStatusMsg of type String.

Database subclass 822 has several operations, including ~deployComponent( ) having no input parameters and no return value, ~doHealthCheck( ) having no input parameters and a Boolean return value, ~installEMHAPrereq( ) having no input parameters and no return value, and ~parseInput ( . . . ) having an input parameter jsonData of type String and no return value.

WebComponent subclass 823 has several attributes and operations. The attributes include ~applicationServer of type ApplicationServer, ~clusterSize of type Integer, ~clusterType of type String, ~contentPort of type String, ~horizontalNodeList of type OperatingSystem, ~loadBalancer of type LoadBalancer, and ~securedContentPort of type String. The operations include ~configureComponent( ) having no input parameters and no return value, ~deployComponent( ) having no input parameters and no return value, ~doHealthCheck( ) having no input parameters and a Boolean return value, ~installEMHAPrereq( ) having no input parameters and no return value, ~parseInput( . . . ) having an input parameter jsonData of type String and no return value, and ~setupCluster( ) having no input parameters and no return value.

EnterpriseServer subclass 824 has several attributes and operations. The attributes include ~database of type Database, ~loadBalancer of type LoadBalancer, and ~pathCode of type String. The operations include ~deployComponent ( ) having no input parameters and no return value, ~doHealthCheck( ) having no input parameters and a Boolean return value, ~installEMHAPrereq( ) having no input parameters and no return value, and ~parseInput( . . . ) having an input parameter jsonData of type String and no return value.

DeploymentServer subclass 825 has several operations, including ~deployComponent( ) having no input parameters and no return value, ~doHealthCheck( ) having no input parameters and a Boolean return value, and ~parseInput ( . . . ) having an input parameter jsonData of type String and no return value.

DevClient subclass 826 has several operations, including ~deployComponent( ) having no input parameters and no return value, ~doHealthCheck( ) having no input parameters and a Boolean return value, and ~parseInput( . . . ) having an input parameter jsonData of type String and no return value.

HTMLServer subclass 831 has an attribute and several operations. The attribute is ~enterpriseServer of type EnterpriseServer. The operations include ~configureComponent ( ) having no input parameters and no return value, and ~doHealthCheck( ) having no input parameters and a Boolean return value.

Application InterfaceServer subclass 832 has an attribute and several operations. The attribute is ~htmlServer of type HTMLServer. The operations include ~configureComponent( ) having no input parameters and no return value, and ~doHealthCheck( ) having no input parameters and a Boolean return value.

BusinessServicesServer subclass 833 has several operations, including ~configureComponent( ) having no input parameters and no return value, and ~doHealthCheck( ) having no input parameters and a Boolean return value.

TransactionServer subclass 834 has several operations, including ~configureComponent( ) having no input parameters and no return value, and ~doHealthCheck( ) having no input parameters and a Boolean return value.

LoadBalancer subclass 835 has several attributes and an operation. The attributes include ~contentPort of type String, ~password of type String, ~securedContentPort of type String, and ~userName of type String. The operation is ~parseInput( . . . ) having an input parameter jsonData of type String and no return value.

OracleTrafficDirector subclass 841 has an operation, i.e., ~configureLoadBalancer( ) having no input parameters and a Boolean return value.

OracleHTTPServer subclass 842 includes several attributes and operations. The attributes include ~componentName of type String, ~domain of type String, ~installPath of type String, and ~serviceName of type String. The operations include configureLoadBalancer( ) having no input parameters and a Boolean return value, and ~parseInput ( . . . ) having an input parameter jsonData of type String and no return value.

OracleLBaas subclass 843 has no attributes or operations.

Figure 9A:
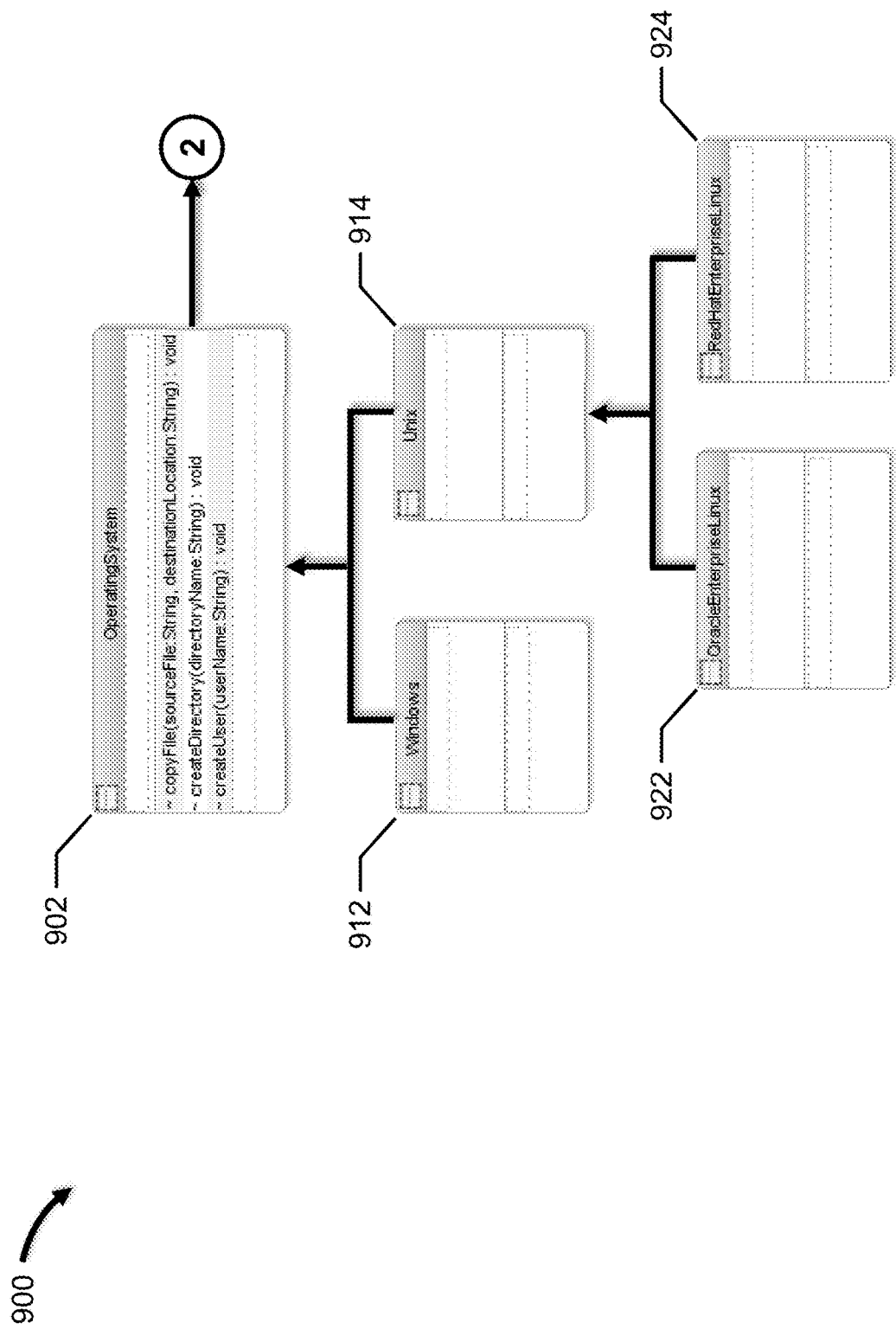

FIG. 9A depicts an operating system class diagram 900, in accordance with an embodiment of the present invention.

OperatingClass class 902 has several operations, including ~copyFile( . . . ) having two input parameters, i.e., sourceFile of type String and destinationLocation of type String, and no return value, ~createDirectory( . . . ) having an input parameter, i.e., directoryName of type String, and no return value, and ~createUser( . . . ) having an input parameter, i.e., userName of type String, and no return value.

Windows subclass 912, Unix subclass 914, OracleEnterpriseLinux subclass 922 and RedHatEnterpriseLinux subclass 924 have no attributes or operations.

Figure 9B:
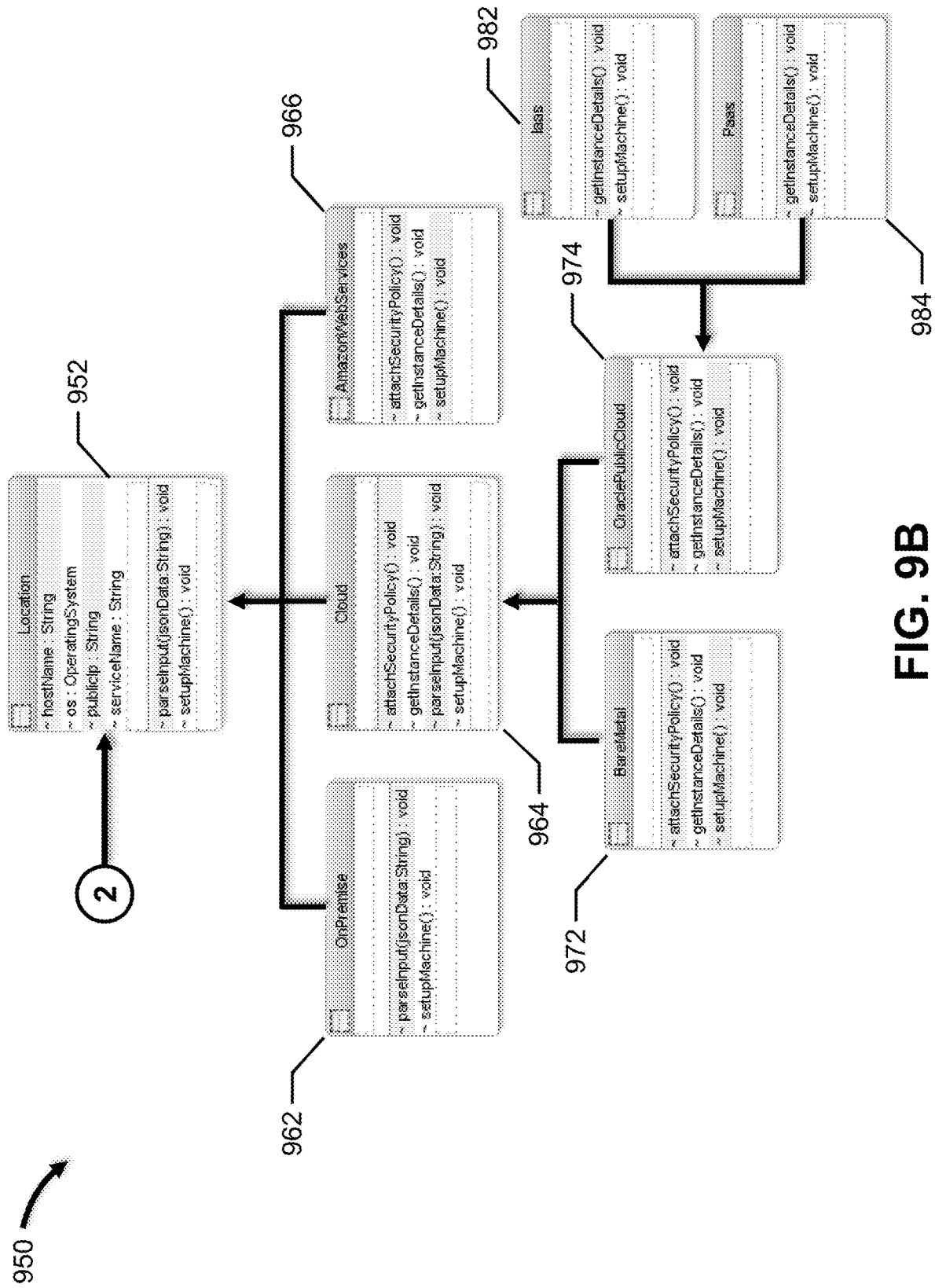

FIG. 9B depicts location class diagram 950, in accordance with an embodiment of the present invention.

Location class 952 has several attributes and operations. The attributes include ~hostName of type String, ~os of type OperatingSystem, ~publicIp of type String, and ~serviceName of type String. The operations include ~parseInput ( . . . ) having an input parameter jsonData of type String and no return value, and ~setupMachine( ) having no input parameters and no return value.

OnPremise subclass 862 has several operations, including ~parseInput( . . . ) having an input parameter jsonData of type String and no return value, and ~setupMachine( ) having no input parameters and no return value.

Cloud subclass 964 has several operations, including ~attachSecurityPolicy( ) having no input parameters and no return value, ~getInstanceDetails( ) having no input parameters and no return value, ~parseInput( . . . ) having an input parameter jsonData of type String and no return value, and ~setupMachine( ) having no input parameters and no return value.

AmazonWebServices subclass 966 has several operations, including ~attachSecurityPolicy( ) having no input parameters and no return value, ~getInstanceDetails( ) having no input parameters and no return value, and ~setupMachine( ) having no input parameters and no return value.

BareMetal subclass 972 has several operations, including ~attachSecurityPolicy( ) having no input parameters and no return value, ~getInstanceDetails( ) having no input parameters and no return value, and ~setupMachine( ) having no input parameters and no return value.

OraclePublicCloud subclass 974 has several operations, including ~attachSecurityPolicy( ) having no input parameters and no return value, ~getInstanceDetails( ) having no input parameters and no return value, and ~setupMachine( ) having no input parameters and no return value.

Iaas subclass 982 has several operations, including ~getInstanceDetails( ) having no input parameters and no return value, and ~setupMachine( ) having no input parameters and no return value.

Paas subclass 984 has several operations, including ~getInstanceDetails( ) having no input parameters and no return value, and ~setupMachine( ) having no input parameters and no return value.

Figure 10:
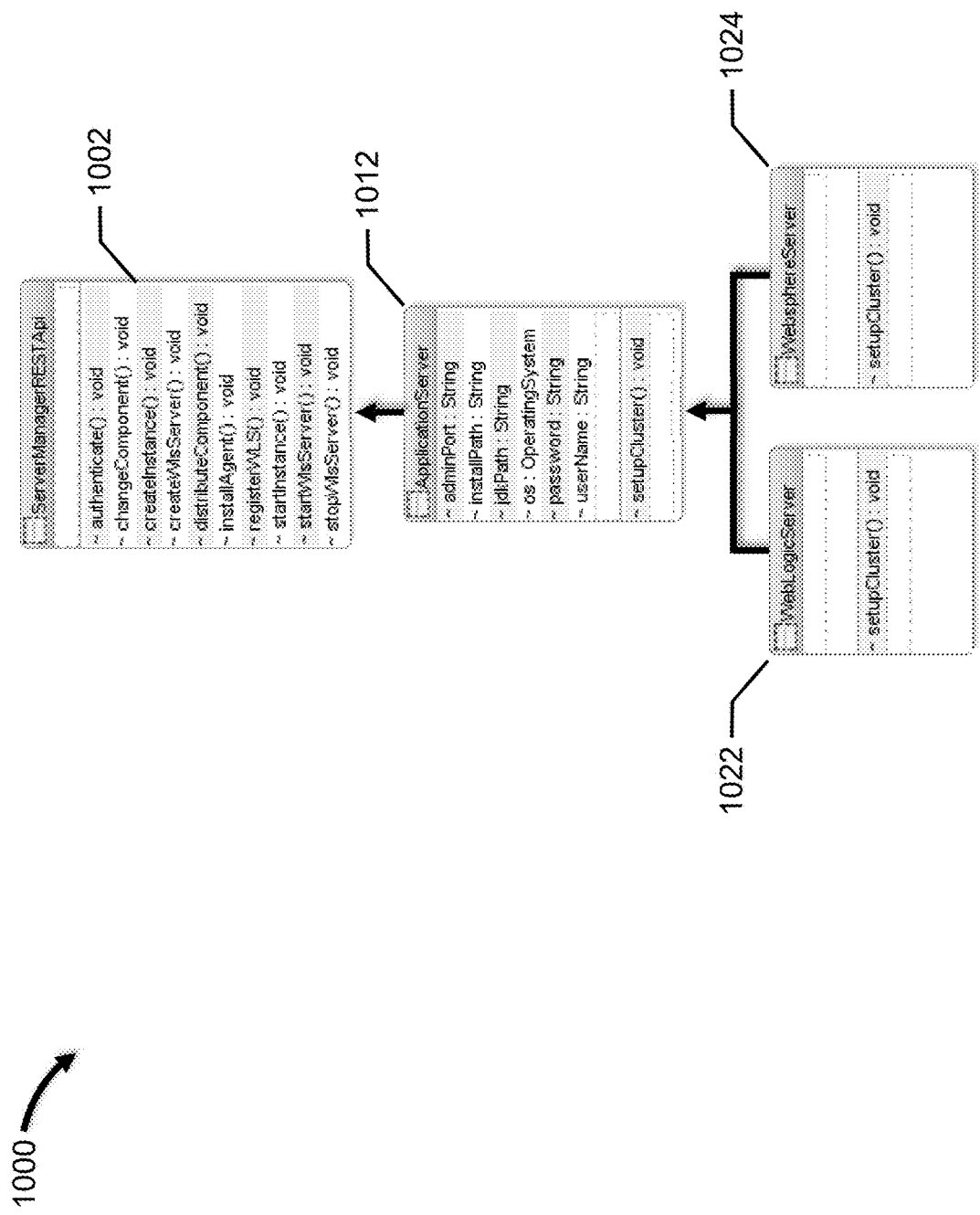

FIG. 10 depicts server manager class diagram 1000, in accordance with an embodiment of the present invention.

ServiceManagerRESTApi class 1002 has several operations, including ~autheticate( ) having no input parameters and no return value, ~changeComponent( ) having no input parameters and no return value, ~createInstance( ) having no input parameters and no return value, ~createWlsServer( ) having no input parameters and no return value, ~distributeComponent( ) having no input parameters and no return value, ~installAgent( ) having no input parameters and no return value, ~registerWLS( ) having no input parameters and no return value, ~startInstance( ) having no input parameters and no return value, ~startWlsServer( ) having no input parameters and no return value, and ~stopWlsServer( ) having no input parameters and no return value.

ApplicationServer subclass 1012 has several attributes and an operation. The attributes include ~adminPort of type String, ~installPath of type String, ~jdkPath of type String, ~os of type OperatingSystem, ~password of type String, and ~userName of type String. The operation is ~setupCluster( ) having no input parameters and no return value.

WebLogicServer subclass 1022 has an operation, i.e., ~setupCluster( ) having no input parameters and no return value.

WebsphereServer subclass 1024 has an operation, i.e., ~setupCluster( ) having no input parameters and no return value.

Figure 11:
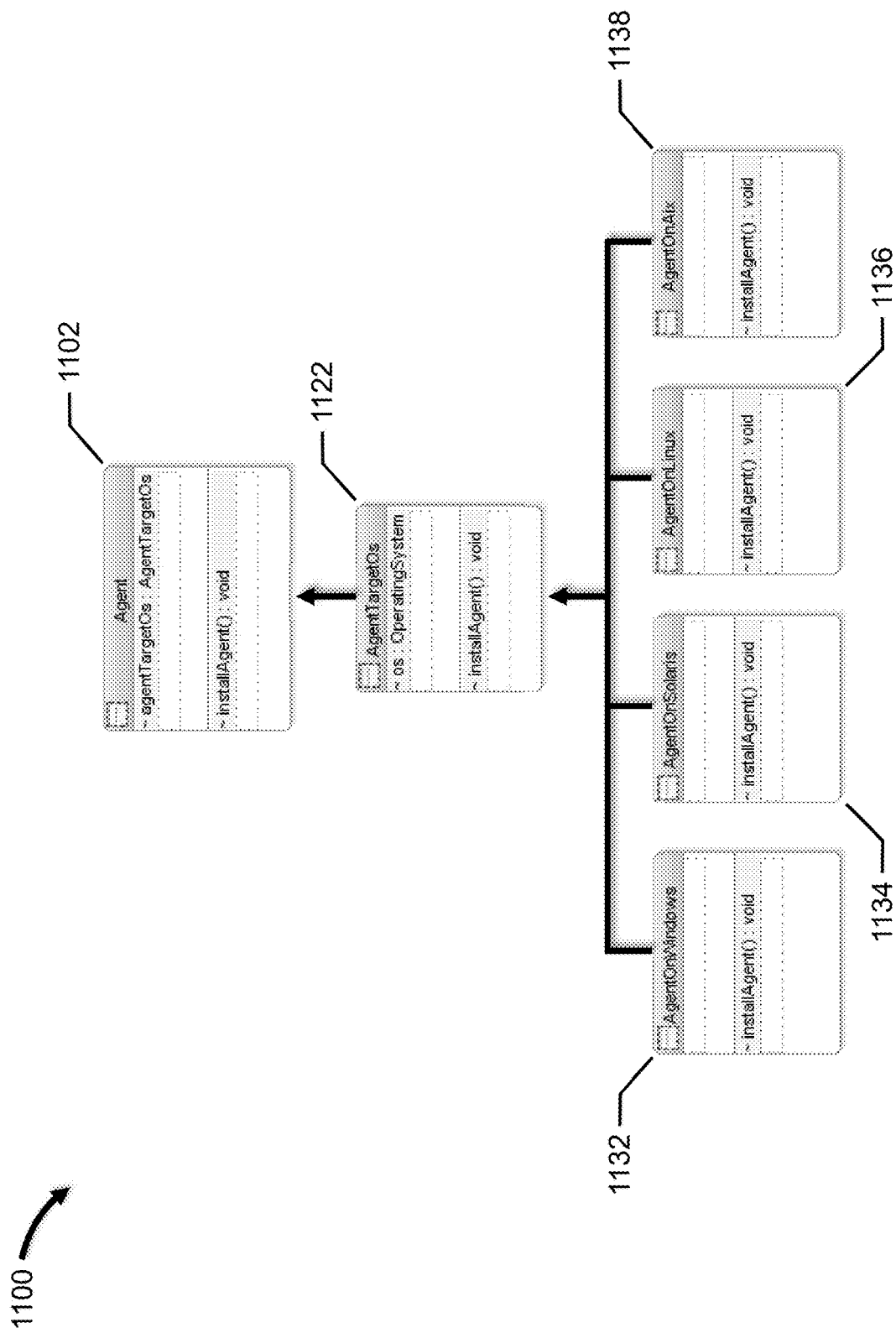

FIG. 11 depicts application server class diagram 1100, in accordance with an embodiment of the present invention.

Agent class 1102 has an attribute and an operation. The attribute is ~agentTargetOs of type AgentTargetOs, and the operation is ~installAgent( ) having no input parameters and no return value.

AgentTargetOs subclass 1122 has an attribute and an operation. The attribute is ~os of type OperatingSystem, and the operation is ~installAgent( ) having no input parameters and no return value.

AgentOnWindows subclass 1132, AgentOnSolaris subclass 1134, AgentOnLinux subclass 1136, and AgentOnAix subclass 1138 each have an operation, i.e., ~installAgent( ) having no input parameters and no return value.

Embodiments of the present invention advantageously provide a computer-readable medium, method and system for provisioning a software application on-premises or in the cloud. An instance of a provisioning object is created and initialized, and a graphical user interface (GUI) is generated. The GUI includes a home window, a configure window, an orchestrate window and a deploy window. The orchestrate window includes a plurality of popup windows. The configure window and the popup windows include widgets to receive provisioning parameters.

The provisioning parameters are received from the GUI. The provisioning parameters indicate whether to deploy the software application on a local network or a remote network. A location object and a deployment object are created and initialized based on the provisioning parameters. The location object includes an on-premises object for a local network deployment or a cloud object for a remote network deployment. A command to deploy the software application is received from the GUI, and the software application is deployed to a local network or a remote network using the provisioning object, the location object and the deployment object.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provision a software application on-premises or in a cloud, the provisioning comprising:

creating and initializing an instance of a provisioning object;

generating a uniform graphical user interface (GUI) including a home window that allows a user to select a configure window, an orchestrate window and a deploy window that receive provisioning parameters from a user interacting with the GUI, the provisioning parameters comprising a selection of deploying the software application either on-premises or in the cloud, the uniform GUI comprising a single window that allows the previously developed software application to be provisioned on either on-premises or in the cloud in response to the user interacting;

receiving the provisioning parameters from the GUI;

creating and initializing a location object and a deployment object based on the provisioning parameters, the location object including an on-premises object for a local network deployment or a cloud object for a remote network deployment, wherein the on-premises object and cloud object are child objects of the location object, the deployment object comprising a software container that includes instances of other objects;

receiving a command to deploy the software application from the GUI; and deploying the software application on-premises in response to the selection of deploying the software application on-premises or in the cloud in response to the selection of deploying the software application in the cloud using the provisioning object, the location object and the deployment object.

2. The non-transitory computer readable medium of claim 1, wherein the deployment object includes an operating system object and a plurality of software application objects.

3. The non-transitory computer readable medium of claim 2, wherein the plurality of software application objects includes a database server object, an enterprise server object and a web component object.

4. The non-transitory computer readable medium of claim 1, wherein the configure window includes widgets to receive a user name, password and a representational state transfer (REST) endpoint.

5. The non-transitory computer readable medium of claim 1, wherein:

the orchestrate window includes a dashboard, a database server popup window, an enterprise server popup window, a web server popup window, and a deployment server popup window, the database server popup window includes widgets to receive provisioning parameters related to one or more database server instances, the enterprise server popup window includes widgets to receive provisioning parameters related to one or more enterprise server instances, the web server popup window includes widgets to receive provisioning parameters related to one or more web server instances, the deployment server popup window includes widgets to receive provisioning parameters related to one or more deployment server instances, and the dashboard displays information related to the database server instances, the enterprise server instances, the web server instances, and the deployment server instances.

6. The non-transitory computer readable medium of claim 5, wherein the deploy window includes a start deployment widget and displays information related to the database server instances, the enterprise server instances, the web server instances, and the deployment server instances.

7. The non-transitory computer readable medium of claim 6, wherein, during the deploying the software application, the deploy window displays a deployment status of each component of the software application.

8. A method for provisioning a software application on-premises or in a cloud, the method comprising:

creating and initializing an instance of a provisioning object;

generating a uniform graphical user interface (GUI) including a home window that allows a user to select a configure window, an orchestrate window and a deploy window that receive provisioning parameters from a user interacting with the GUI, the provisioning parameters comprising a selection of deploying the software application either on-premises or in the cloud, the uniform GUI comprising a single window that allows the previously developed software application to be provisioned on either on-premises or in the cloud in response to the user interacting;

receiving the provisioning parameters from the GUI;

creating and initializing a location object and a deployment object based on the provisioning parameters, the location object including an on-premises object for a local network deployment or a cloud object for a remote network deployment, wherein the on-premises object and cloud object are child objects of the location object, the deployment object comprising a software container that includes instances of other objects;

receiving a command to deploy the software application from the GUI; and deploying the software application on-premises in response to the selection of deploying the software application on-premises or in the cloud in response to the selection of deploying the software application in the cloud using the provisioning object, the location object and the deployment object.

9. The method of claim 8, wherein the deployment object includes an operating system object and a plurality of software application objects.

10. The method of claim 9, wherein the plurality of software application objects includes a database server object, an enterprise server object and a web component object.

11. The method of claim 8, wherein the configure window includes widgets to receive a user name, password and a representational state transfer (REST) endpoint.

12. The method of claim 8, wherein:

the orchestrate window includes a dashboard, a database server popup window, an enterprise server popup window, a web server popup window, and a deployment server popup window, the database server popup window includes widgets to receive provisioning parameters related to one or more database server instances, the enterprise server popup window includes widgets to receive provisioning parameters related to one or more enterprise server instances, the web server popup window includes widgets to receive provisioning parameters related to one or more web server instances, the deployment server popup window includes widgets to receive provisioning parameters related to one or more deployment server instances, and the dashboard displays information related to the database server instances, the enterprise server instances, the web server instances, and the deployment server instances.

13. The method of claim 12, wherein the deploy window includes a start deployment widget and displays information related to the database server instances, the enterprise server instances, the web server instances, and the deployment server instances.

14. The method of claim 13, wherein, during the deploying the software application, the deploy window displays a deployment status of each component of the software application.

15. A system for provisioning a software application on-premises or in a cloud, the system comprising:
   a memory; and
   one or more processors, coupled to the memory and a local network or a remote network, configured to:
      create and initialize an instance of a provisioning object;
      generate a uniform graphical user interface (GUI) including a home window that allows a user to select a configure window, an orchestrate window and a deploy window that receive provisioning parameters from a user interacting with the GUI, the provisioning parameters comprising a selection of deploying the software application either on-premises or in the cloud, the uniform GUI comprising a single window that allows the previously developed software application to be provisioned on either on-premises or in the cloud in response to the user interacting;
      receive the provisioning parameters from the GUI;
      create and initialize a location object and a deployment object based on the provisioning parameters, the location object including an on-premises object for a local network deployment or a cloud object for a remote network deployment, wherein the on-premises object and cloud object are child objects of the location object, the deployment object comprising a software container that includes instances of other objects;
      receive a command to deploy the software application from the GUI; and
      deploy the software application on-premises in response to the selection of deploying the software application on-premises or in the cloud in response to the selection of deploying the software application in the cloud using the provisioning object, the location object and the deployment object.

16. The system of claim 15, wherein the deployment object includes an operating system object and a plurality of software application objects.

17. The system of claim 16, wherein the plurality of software application objects includes a database server object, an enterprise server object and a web component object.

18. The system of claim 15, wherein the configure window includes widgets to receive a user name, password and a representational state transfer (REST) endpoint.

19. The system of claim 15, wherein:
   the orchestrate window includes a dashboard, a database server popup window, an enterprise server popup window, a web server popup window, and a deployment server popup window,
   the database server popup window includes widgets to receive provisioning parameters related to one or more database server instances,
   the enterprise server popup window includes widgets to receive provisioning parameters related to one or more enterprise server instances,
   the web server popup window includes widgets to receive provisioning parameters related to one or more web server instances,
   the deployment server popup window includes widgets to receive provisioning parameters related to one or more deployment server instances, and
   the dashboard displays information related to the database server instances, the enterprise server instances, the web server instances, and the deployment server instances.

20. The system of claim 19, wherein:
   the deploy window includes a start deployment widget and displays information related to the database server instances, the enterprise server instances, the web server instances, and the deployment server instances, and
   during said deploying the software application, the deploy window displays a deployment status of each component of the software application.

* * * * *